(12) United States Patent
Peterson et al.

(10) Patent No.: US 11,430,577 B2
(45) Date of Patent: Aug. 30, 2022

(54) ASYMMETRIC CAPSULE FOR INERTIAL CONFINEMENT FUSION

(71) Applicant: Lawrence Livermore National Security, LLC, Livermore, CA (US)

(72) Inventors: Luc Peterson, Livermore, CA (US); Scott T. Brandon, Livermore, CA (US); John E. Field, Livermore, CA (US); Kelli Denise Humbird, Livermore, CA (US); Steve Langer, Livermore, CA (US); Ryan Charles Nora, Livermore, CA (US); Brian K. Spears, Livermore, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 301 days.

(21) Appl. No.: 16/090,807

(22) PCT Filed: Aug. 2, 2017

(86) PCT No.: PCT/US2017/045150
§ 371 (c)(1),
(2) Date: Oct. 2, 2018

(87) PCT Pub. No.: WO2018/026949
PCT Pub. Date: Feb. 8, 2018

(65) Prior Publication Data
US 2020/0327998 A1   Oct. 15, 2020

Related U.S. Application Data

(60) Provisional application No. 62/370,164, filed on Aug. 2, 2016.

(51) Int. Cl.
*G21B 1/03*   (2006.01)
*G21B 1/19*   (2006.01)

(52) U.S. Cl.
CPC ................. *G21B 1/03* (2013.01); *G21B 1/19* (2013.01)

(58) Field of Classification Search
CPC .................................... G21B 1/03; G21B 1/19
(Continued)

(56) References Cited

U.S. PATENT DOCUMENTS

2011/0261919 A1   10/2011   Sefcik et al.
2012/0057665 A1    3/2012   Moses et al.
(Continued)

FOREIGN PATENT DOCUMENTS

EP         3007522 A1    4/2016
JP      2014081274 A    5/2014

OTHER PUBLICATIONS

Lindl et al., "Review of the National Ignition Campaign 2009-2012," 2014, Physics of Plasmas, vol. 21, 020501 (2014) (Year: 2014).*

(Continued)

*Primary Examiner* — Jack W Keith
*Assistant Examiner* — Jinney Kil
(74) *Attorney, Agent, or Firm* — Perkins Coie LLP

(57) ABSTRACT

Methods, devices and system for asymmetric inertial confinement fusion are disclosed. One method includes a fixing in position a target capsule comprising an inertial confinement fusion fuel, where the target capsule is substantially spherical. The method further includes for applying an oscillatory compression to the target capsule. The oscillatory compression includes compression at a first time in a radial direction orthogonal to a diametric axis of the target capsule, and compression at a second time along the diametric axis to drive the target capsule into driven into an ovoid shape. The oval shaped target can implode upon being further driven at a third time.

13 Claims, 17 Drawing Sheets

(58) Field of Classification Search
USPC .......................................................... 376/102
See application file for complete search history.

(56) References Cited

U.S. PATENT DOCUMENTS

2014/0334585 A1* 11/2014 Perkins .................... G21B 1/23
376/103
2014/0348283 A1* 11/2014 Perkins .................... G21B 1/19
376/103

OTHER PUBLICATIONS

Mordecai D. Rosen, "Laser-Plasma Interactions and Applications; Chapter 8: Indirect Drive at the NIF Scale," 2013, Springer, pp. 185-219 (Year: 2013).*
Murakami et al., "A New Twist for Inertial Fusion Energy: Impact Ignition," 2005, Nuclear Instruments and Methods in Physics Research, A 544 (2005), pp. 67-75 (Year: 2005).*
Ceglio et al., "Spatially Resolved Alpha Emission form Laser Fusion Targets," 1977, Physical Review Letters, vol. 39, No. 1, pp. 20-24 (Year: 1977).*
Edwards, M., et al., "Progress towards ignition on the National Ignition Facility," Physics of Plasmas, vol. 20, Issue 7, Article No. 070501, Jul. 2013.
Haan, S., et al., "Point design targets, specifications, and requirements for the 2010 ignition campaign on the National Ignition Facility," Physics Plasmas, vol. 18, Issue 5, Article No. 051001; May 2011.
International Search Report and Written Opinion of International Application No. PCT/US2017/045150; dated Feb. 13, 2018; 11 pages.
Kritcher, A., et al., "Metrics for long wavelength asymmetries in inertial confinement fusion implosions on the National Ignition Facility," Physics of Plasmas, vol. 21, Issue 4, Article No. 042708, Apr. 2014.
Lindl, J., "Development of the indirect-drive approach to inertial confinement fusion and the target physics basis for ignition and gain," Physics of Plasmas vol. 2, Issue 11, 3933-4024 (1995).
Nora, R., et al., "Theory of hydro-equivalent ignition for inertial fusion and its applications to OMEGA and the National Ignition Facility," Physics of Plasmas, vol. 21, Issue 5, Article No. 056316, May 2014.
Perkins, L., et al., "Shock Ignition: A New Approach to High Gain Inertial Confinement Fusion on the National Ignition Facility," Phys. Rev. Lett., vol. 103, Issue 4, Article No. 045004, Jul. 23, 2009.
Peterson, J., et al., "Zonal flow generation in inertial confinement fusion implosions," Physics of Plasmas, vol. 24, Issue 3, 032702, Mar. 2017.
Tabak, M, et al., "Ignition and high gain with ultrapowerful lasers," Physics of Plasmas, vol. 1, Issue 5, pp. 1626-1634, May 1994.

* cited by examiner

470

Driving a target capsule on a first axis with a first predetermined energy — 475

Driving the target capsule on a second axis with a second predetermined energy — 480

Driving the target capsule on one of more of the first axis and the second axis at a third predetermined energy, wherein the driving on the first axis, the driving on the second axis, and the driving on one or more of the first axis and the second axis causes ignition of the target capsule. — 485

FIG. 4B

ASYMMETRIC CAPSULE FOR INERTIAL CONFINEMENT FUSION

CROSS-REFERENCE TO RELATED APPLICATIONS

This patent application claims the benefit of priority of U.S. Provisional Patent Application No. 62/370,164, filed on Aug. 2, 2016. The entire content of the before-mentioned patent application is incorporated by reference as part of the disclosure of this application.

STATEMENT REGARDING FEDERALLY SPONSORED RESEARCH OR DEVELOPMENT

This invention was made with government support under Contract DE-AC52-07NA27344 awarded by U.S. Department of Energy. The government has certain rights in the invention.

TECHNICAL FIELD

The present disclosure relates to energy production by nuclear fusion.

BACKGROUND

The aim of fusion energy, such as inertial confinement fusion (ICF), is to contain fusion material at high temperatures and densities long enough to produce net energy gain. In ICF, a spherical shell of material (e.g. deuterium and tritium (DT) fuel) may be compressed several times in volume, using lasers, x-rays, or magnetic fields. In order to achieve high energy production, the compression may remain spherical without being disturbed by hydrodynamic instabilities in flight. However, achieving spherical and stable compression may be an obstacle to ignition.

Prior attempts include creating a uniform capsule drive, driving the implosion with more energy, and imploding capsules with tight engineering tolerances on seed imperfections. Since the constraints are very tight, alternate schemes include relaxing the compression requirement, shock-igniting the capsule, and fast-ignition. However, these solutions have limitations. In particular, tight engineering and fielding constraints increase the cost of individual implosions, decreasing their attractiveness for energy production. Neither shock nor fast ignition at ignition-scale energies have been tested, and both require significant capital investment.

SUMMARY

One aspect of the disclosed technology relates to a method for asymmetric inertial confinement fusion. The method includes fixing in position a target capsule comprising an inertial confinement fusion fuel, wherein the target capsule is substantially spherical. The method further includes applying an oscillatory compression to the target capsule. The oscillatory compression includes compression at a first time in a radial direction orthogonal to a diametric axis of the target capsule, and compression at a second time along the diametric axis. The target capsule is driven into an ovoid shape and the ovoid shaped target capsule implodes at a third time upon application of an additional oscillatory compression.

The following features may be included in any combination. The first time occurs before the second time and the second time occurs before the third time. The target capsule can include deuterium and/or tritium or helium-3. The target capsule is held inside a hohlraum. The target capsule may be cooled in the hohlraum and/or held in the hohlraum by support structures, such as membranes, foams, wires, etc. The compression can be performed by one or more of a laser beam or an ion beam.

In another aspect an asymmetric inertial confinement fusion target capsule is disclosed. The target capsule includes an ovoid shaped shell and includes a fuel comprising deuterium and/or tritium. The target capsule is positioned inside a hohlraum. The target capsule can be cooled in the hohlraum and/or held in the hohlraum by one or more support structures. The compression is performed by one or more of a laser beam or an ion beam. The target capsule is positioned to receive an oscillatory energy to cause nuclear ignition of the target capsule. The oscillatory energy is provided by a driver that is configured to drive the target capsule with more energy along a first axis than a second axis orthogonal to the first axis, and subsequently drive the target capsule with more energy along the second axis than the first axis. The first axis may be an equatorial axis and the second axis may be a polar axis.

In another aspect an apparatus for driving a target capsule in an inertial confinement fusion system is disclosed. The apparatus includes a first driver to deliver energy to the target capsule along a first axis, and a second driver to deliver energy to the target capsule along a second axis, where the second axis is orthogonal to the first axis. The apparatus also includes a controller configured to cause the first driver and the second driver to deliver energy to the target capsule in a sequence. The sequence includes delivering energy to the target capsule including a first energy along the first axis and a second energy along the second axis, wherein the first energy is greater than the second energy, and delivering energy to the target capsule including a third energy along the first axis and a fourth energy along the second axis, wherein the fourth energy is greater than the third energy.

The following features may be included in any combination. The sequence may further include delivering a fifth energy to the target capsule, wherein the fifth energy includes energy along the first axis and energy along the second axis having approximately equal values. The first axis may be an equatorial axis and/or the second axis may be a polar axis. The target capsule may include deuterium and/or tritium. The target fuel capsule can be held inside a hohlraum; the target capsule may be cooled in the hohlraum, and/or held in the hohlraum using a support structure. The first energy, the second energy, the third energy, and the fourth energy may be provided by one or more of a laser beam or an ion beam. The first driver and the second driver are positioned to directly drive the target capsule. The first driver and the second driver are positioned to indirectly drive the target capsule by directing beams that impinge on an inside surface of a hohlraum before reaching the target capsule.

BRIEF DESCRIPTION OF THE DRAWINGS

FIG. 4B depicts an example of a process, in accordance with some example embodiments.

Where possible, like reference numbers refer to the same or similar features in the drawings.

Figure 1:
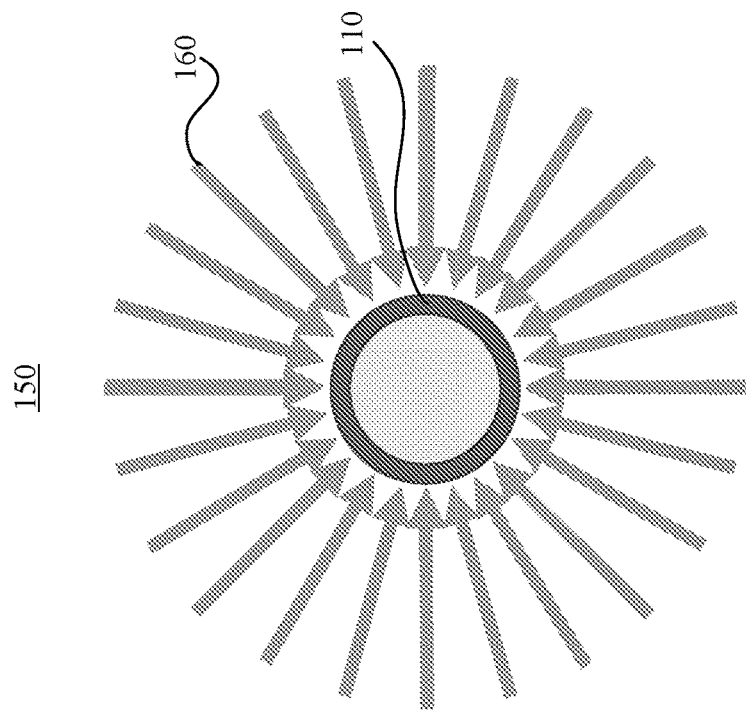
FIG. 1 depicts examples of symmetrically driving a spherical target capsule, in accordance with some example embodiments.
Figure 1:
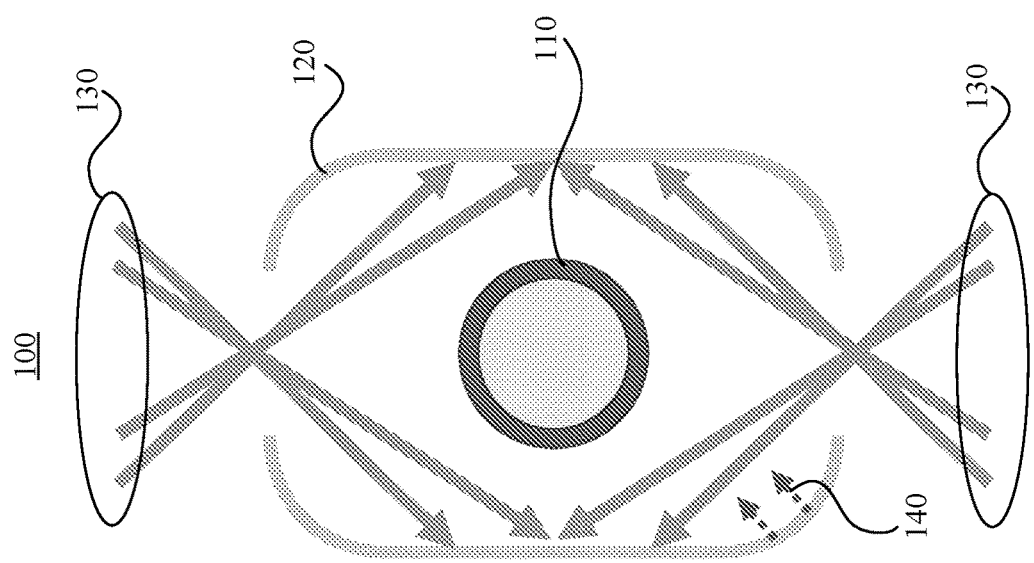

Generally, the present disclosure is directed to an asymmetric ICF method and ovoid target capsule for achieving.

DETAILED DESCRIPTION

The disclosed subject matter is directed to asymmetric inertial confinement fusion (ICF) technology and ovoid target capsule for achieving robust compression and ignition of thermonuclear fusion fuel. Both the disclosed methodology and the target capsule are configured to produce an asymmetric ovoid shaped implosion that is resistant to implosion imperfections. The ovoid geometry may create an internal flow field that protects the central hot region during stagnation. Disclosed embodiments solve both problems of hydrodynamic instabilities and capsule distortions via an asymmetric implosion. Unlike round implosions, ovoid (e.g. 3D oval or eggshell shaped) target fuel capsules can achieve high pressures in the presence of asymmetric drive and hydrodynamic instabilities. Such ovoid shells can be either pre-manufactured in the ideal shape or dynamically driven from an initially spherical shape to an ovoid shape. Due to enhanced implosion robustness, the engineering tolerances on the ovoid capsules can be relaxed.

One example embodiment is an ovoid-shaped ICF target fuel capsule that includes an ICF fusion fuel, such as deuterium and/or tritium. These capsules may be pre-manufactured to have a predetermined ovoid shape.

Another example embodiment is an asymmetric ICF method which dynamically compresses a substantially spherical target into an ovoid shape during implosion. The method for dynamic compression includes an oscillatory drive that first compresses a substantially spherical target in a radially inward direction orthogonal to a diametric axis, followed by compressing the target along the diametric axis. The diametric axis may be characterized as a polar axis in alignment with opposing poles. The foregoing first stage of the asymmetric compression may be characterized as directed along the equator and considered a "waist hot drive," and the second stage may be characterized as being directed on the poles and considered a "pole hot drive." This type of compression is counter to 40 years of ICF research, which asserts that compression must be nearly one-dimensional such as spherical to achieve high gain.

In both the method and target capsule embodiments, the target fuel capsule may be contained in a hohlraum, such as a cylindrical hohlraum. For example, a cylindrical hohlraum may be used at the National Ignition Facility of the Lawrence Livermore National Laboratory. It is appreciated that references to a hohlraum axis are equivalent to the cylindrical/longitudinal axis in the case of a cylindrical hohlraum. When contained in a cylindrical hohlraum, the ovoid target capsule may be oriented with its longitudinal/major axis aligned with the hohlraum axis.

Conventional ICF calls for ignition via round implosions with convergence at high velocity to achieve high pressure. Conventional ICF holds that deviations from sphericity rob the implosion of energy conversion efficiency and so a round driver is needed. High velocity and/or high convergence can lead to unstable linear growth of imperfections which leads to needing tight engineering tolerances to minimize the impact from instability seeds. Conventional thought holds that spherical implosions are required.

Contrary to conventional thought, non-round shaped implosions may perform better than round implosions. As described below, the disclosed non-round implosions produce a greater yield amplification (higher ignition margin). For example, a calculated yield for an example round implosion may produce a burn-off energy of 0.05 mega-Joules (MJ), a burn-on energy of 15.1 MJ, and a yield amplification of 302. A calculated yield for an example ovoid implosion may produce a burn-off energy of 0.04 MJ, a burn-on energy of 16.2 MJ, and a yield amplification of 371. As described below, ovoid shapes are stable because of large induced flow fields. Flow fields prevent instabilities and other drive asymmetries from distorting hot spots providing much higher pressures than round implosions. Robust implosions may be generated by using a time-varying drive. An early waist-hot drive may produce a sausage-like shell and a later pole-hot drive may cause the shell to be ovoid shaped. This is counter to conventional thought which holds that the drive must be very round (e.g., symmetric drive from all directions) for the entire implosion.

In some example embodiments, an asymmetric inertial confinement fusion (ICF) method includes providing a substantially spherical target capsule comprising an ICF fuel. The method can further include dynamically compressing the target capsule so that the target capsule is initially compressed in a radial direction orthogonal to a diametric axis of the target capsule so as to elongate the target capsule and form opposing poles, and subsequently compressed along the diametric axis at the poles, whereby the target capsule is driven to implode with an ovoid geometry. In some example embodiments, an asymmetric inertial confinement fusion (ICF) target fuel capsule includes an ovoid shell comprising an ICF fuel material.

The left hand side of FIG. 1 depicts at 100 a target capsule in a hohlraum 120 heated via indirect drive, and the right hand side of FIG. 1 depicts a target capsule at 150 not in a hohlraum heated via direct drive. At 150, direct drive beams 160 spherically impinge on target capsule 110. For example, target capsule 110 may be spherically shaped and direct drive beams 160 may impinge normal to the surface at each position on the surface of the spherical target capsule. When the direct drive beams are of equal intensity, the target capsule is uniformly heated on the surface. The direct drive beams may include laser beams, ion beams, or other particle or electromagnetic beams. At 100, capsule 110 is held inside hohlraum 120. In some example embodiments, the hohlraum may be made of gold, uranium, or other material. In some example embodiments, the target capsule 110 may be held in place in the hohlraum by one or more support structures, such as wires, foams and the like. The cooling can be effectuated using an external device; as a result of cooling ice can form inside the capsule. Drive beams 130 impinge on the inside surface of hohlraum 120. The drive beams impinging on the hohlraum cause the hohlraum material to radiate electromagnetic energy 140 such as x-rays. The radiated electromagnetic energy 140 impinges on the target capsule 110 causing the capsule to be heated. Because the hohlraum absorbs drive energy and then radiates electromagnetic energy, the configuration at 100 may be referred to as indirect drive.

Figure 2:
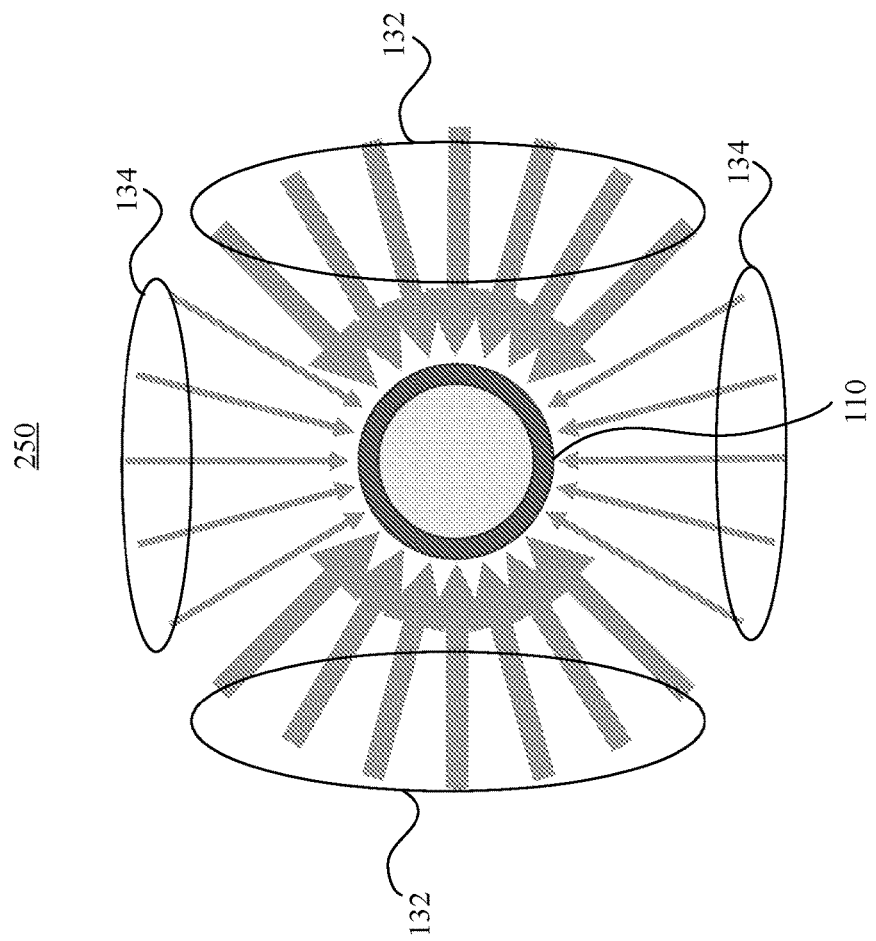
FIG. 2 depicts examples of asymmetrically driving a target capsule, in accordance with some example embodiments.
Figure 2:
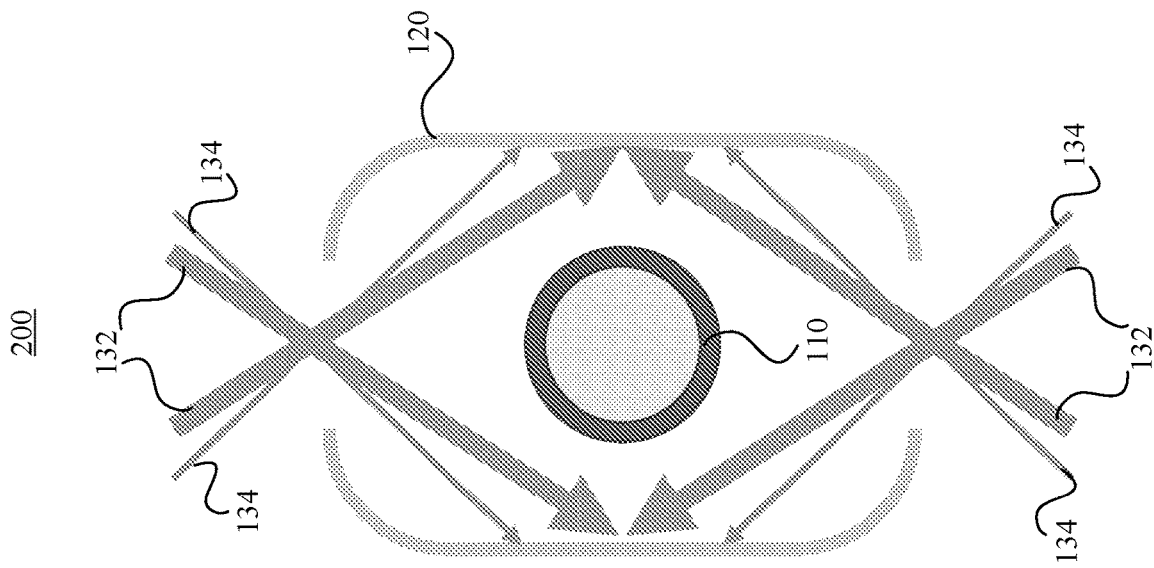

The right hand side of FIG. 2 depicts a hot-waist drive in a direct drive configuration at 250 and the left hand side of FIG. 2 depicts an indirect drive configuration at 200. Hot-waist drive may also be referred to herein as an equatorial drive. In some example embodiments, hot-waist drive may be accomplished by directly or indirectly driving the waist of target capsule 110 at a higher energy level than the polar axis which is orthogonal to the waist axis. For example, drive 132 may cause the hot-waist drive by being more energetic than drive 134. Drives 132 and 134 may be referred to as asymmetric because one axis drives at a higher energy that the orthogonal axis drive.

Figure 3:
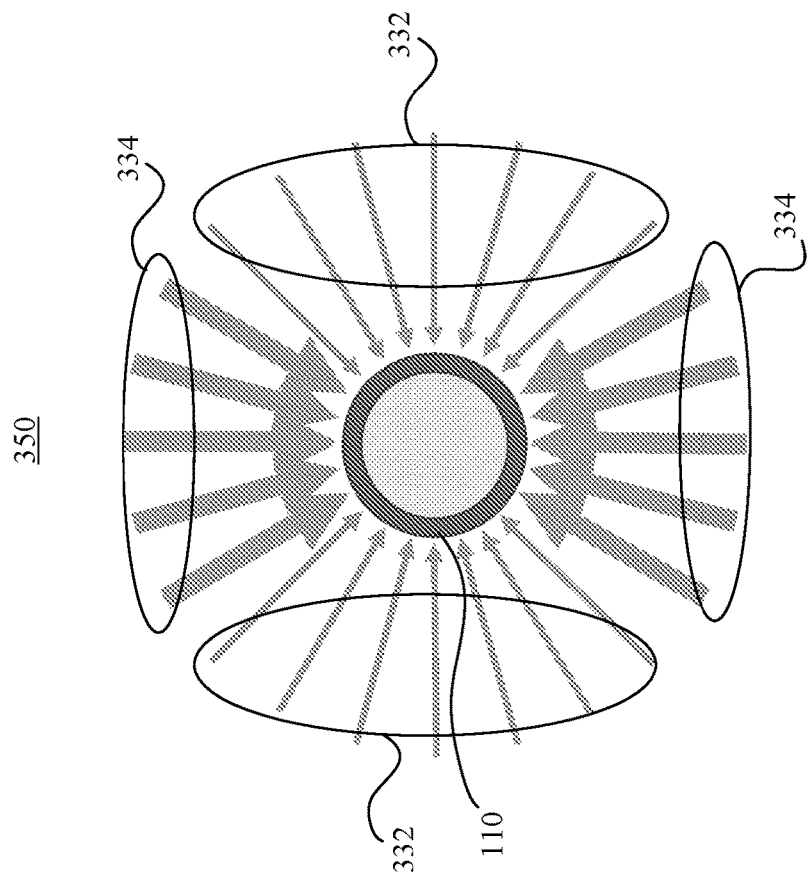
FIG. 3 depicts other examples of asymmetrically driving a target capsule, in accordance with some example embodiments.
Figure 3:
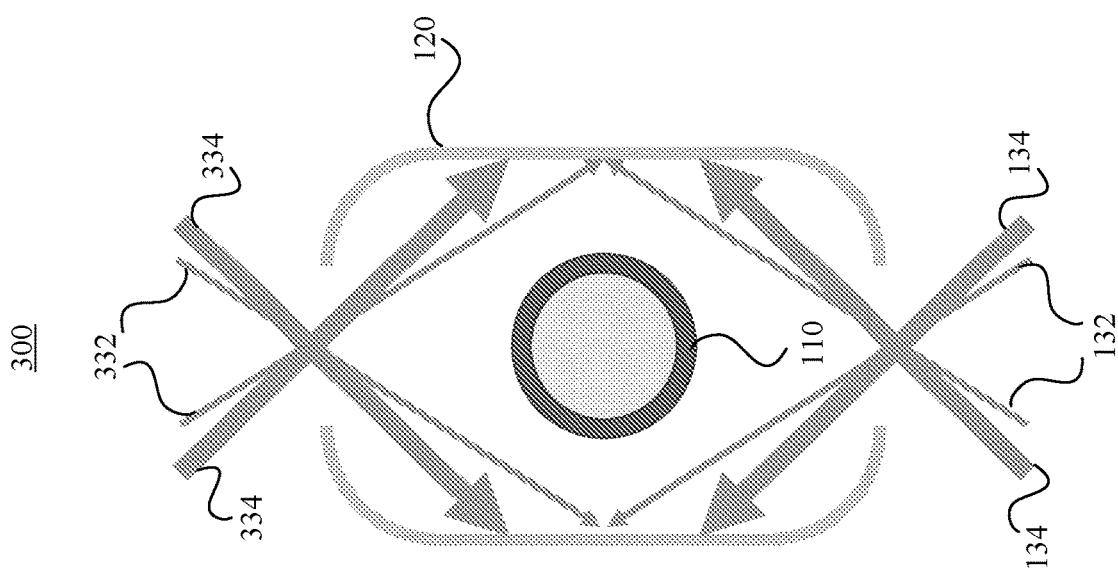

The right hand side of FIG. 3 depicts a hot-polar drive in a direct drive configuration at 350 and the left hand side of FIG. 3 depicts an indirect drive configuration at 300. In some example embodiments, hot-polar drive may be accomplished by directly or indirectly driving the poles of target capsule 110 at a higher energy level than the waist axis which is orthogonal to the polar axis. For example, drive 334 may be more energetic than drive 332 thereby causing the hot-pole drive. In some example embodiments, the hot-polar drive may follow in time the hot-waist drive. In other example embodiments, the hot-polar drive of FIG. 3 may occur before the hot-waist drive of FIG. 2.

Figure 4A:
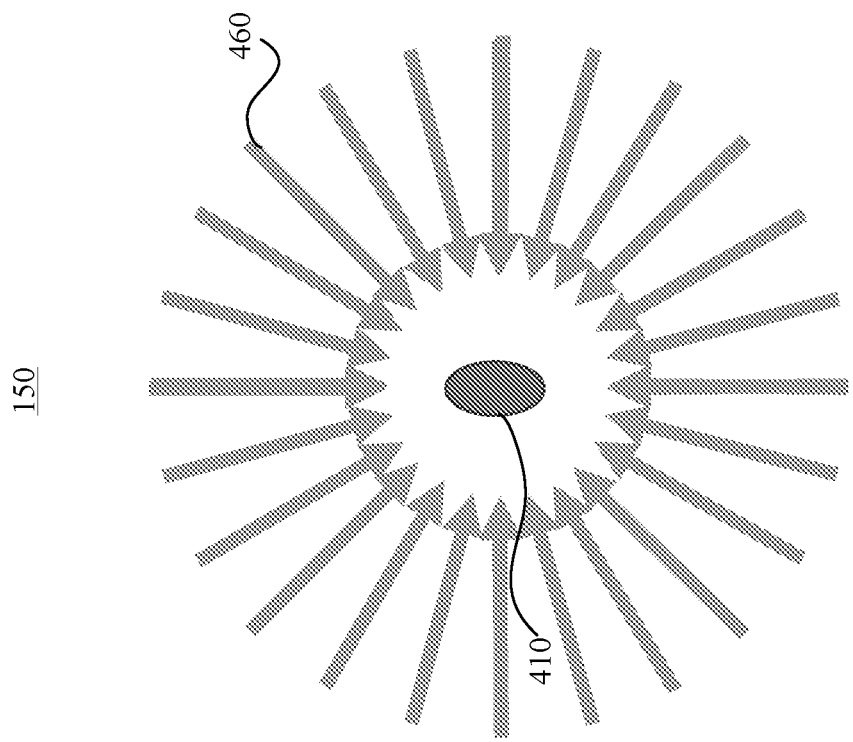
FIG. 4A depicts examples of symmetrically driving an ovoid target capsule, in accordance with some example embodiments.
Figure 4A:
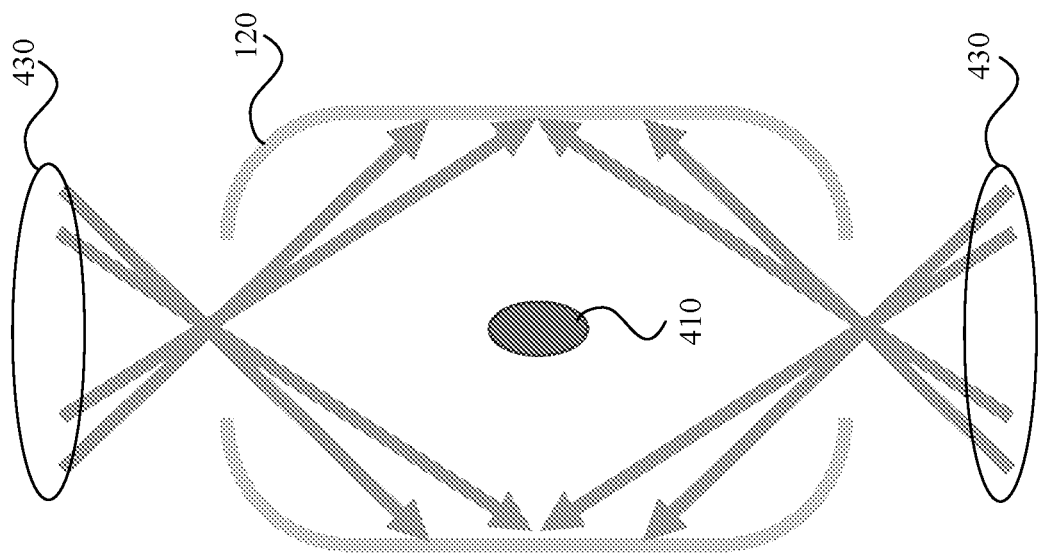

FIG. 4A depicts a target capsule 410 after the waist drive depicted in FIG. 2 and the polar drive depicted in FIG. 3. Due to the waist and polar drives, the target capsule can be deformed from a spherical shape to a ovoid shape. The beams 430 may be of similar intensities or equal intensities to one another. Similarly, the beams 460 may be of similar intensities or equal intensities to one another. Beams 430 and 460 can cause heating and compression to produce ignition of target capsule 410. For example, target capsule 410 may be compressed to 1/30th of its original size, or another compressed size.

FIG. 4B depicts a process 470, in accordance with some example embodiments. In particular, at 475, a target capsule is driven on a first axis with a first predetermined energy. A drive may be expressed as an energy and a direction from which the energy impinges on the target capsule. For example, as shown in FIG. 3, target capsule 110 may be driven with a higher energy along the polar axis at 334 than the equatorial axis at 332. The drive energy may correspond to a radiation temperature as described below. The stronger drive along one axis such as the polar axis compared to an orthogonal axis such as the equatorial axis may be referred to as a drive asymmetry. The drive asymmetry may be expressed as a percentage of stronger (or weaker) drive along one axis compared to the orthogonal axis. For example, in FIG. 3 the asymmetry may be expressed as a percentage, such as 2%, stronger drive along the polar axis than the equatorial axis. Any other percentage asymmetric drive may also be used. In some example embodiments, the first drive may be an axis different from a the polar axis. For example, the first drive axis may be an equatorial axis.

At 480, the target capsule is driven on a second axis with a second predetermined energy. For example, as shown in FIG. 2, target capsule 110 may be driven with a higher energy along the equatorial axis at 132 than the polar axis at 134. In FIG. 2, the asymmetry may be expressed as a percentage, such as 3%, stronger drive along the equatorial axis that the polar axis. Any other percentage asymmetric drive may also be used. In some example embodiments, the second drive may be driven along an axis different from the equatorial axis. For example, the second drive axis may be a polar axis.

At 485, the target capsule may be driven on one of more of the first axis and the second axis at with a third predetermined energy to cause the target capsule to ignite in a nuclear reaction. For example, the third predetermined energy may include driving the first axis and the driving the second axis with equal or nearly equal energies. For example, the equal or nearly equal energy drive on both axes may correspond to a spherical drive to the target capsule. In another example, the third predetermined energy may include driving the target capsule asymmetrically with greater energy on one axis such as the polar axis or the equatorial axis. In some example embodiments, the first drive at 475, the second drive at 480, and the third drive at 485 may be followed by other oscillatory drives such as the foregoing drive on one axis followed by drive along an orthogonal axis. In some example embodiments, the third drive may cause ignition, and in other embodiments, later drives may cause ignition. Ignition may follow an asymmetric drive or a spherical drive.

Figure 5:
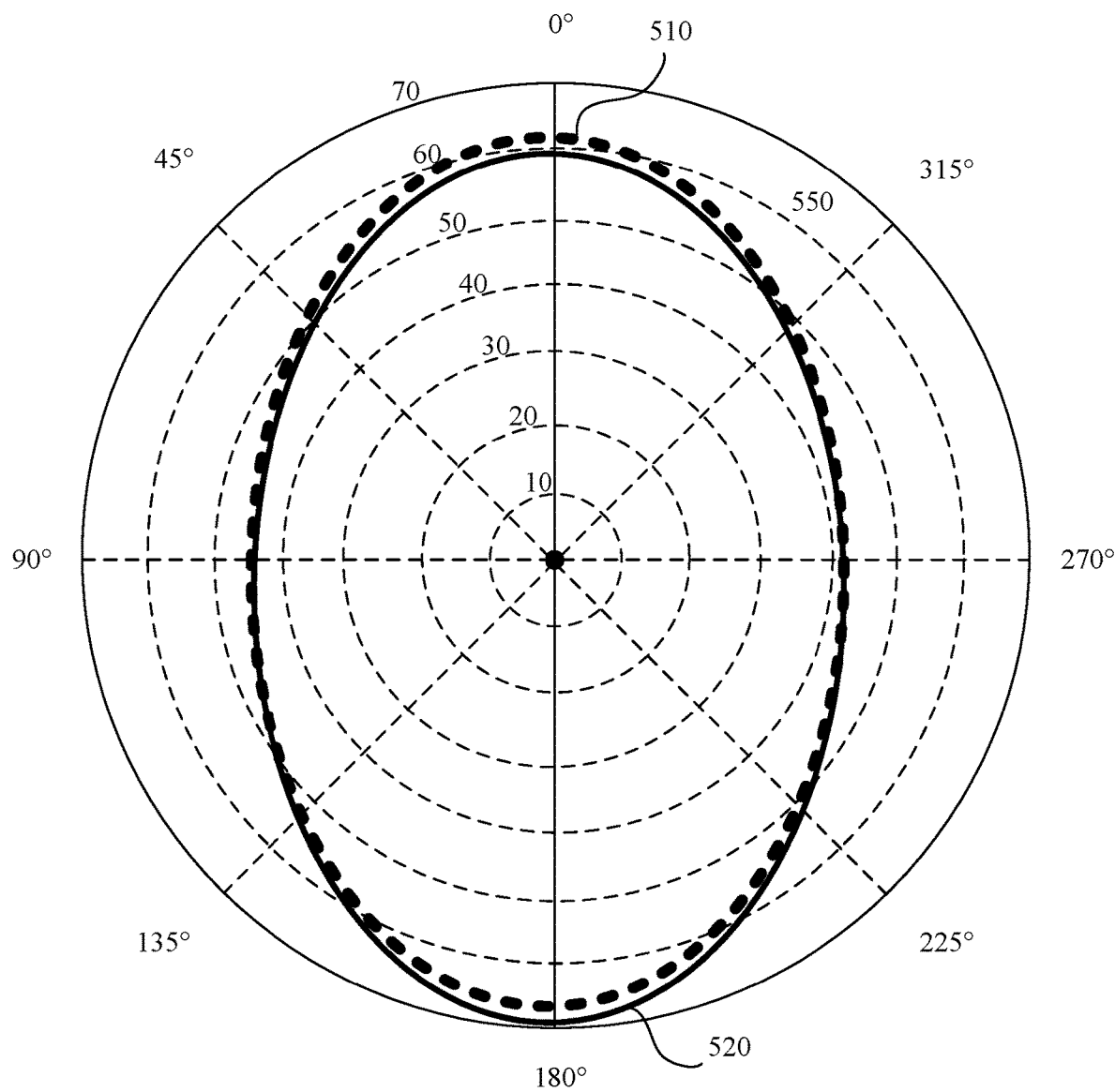
FIG. 5 depicts examples of two ovoid shaped target capsules, in accordance with some example embodiments.

FIG. 5 depicts two example ovoid shapes for target capsules, in accordance with some example embodiments. Shown at 520 is an ovoid shape found using a machine learning system as further described below. Shown at 510 is an ovoid shape determined using HYDRA simulation code based on the ovoid shape found using machine learning. The HYDRA-determined shape at 510 may have a much higher energy released and/or much improved metrics such as ignition factor compared to the spherical target capsule. The HYDRA-determined shape at 510 may have a higher energy released and/or improved metrics such as ignition factor compared to the target capsule shape found using machine learning.

Figure 6:
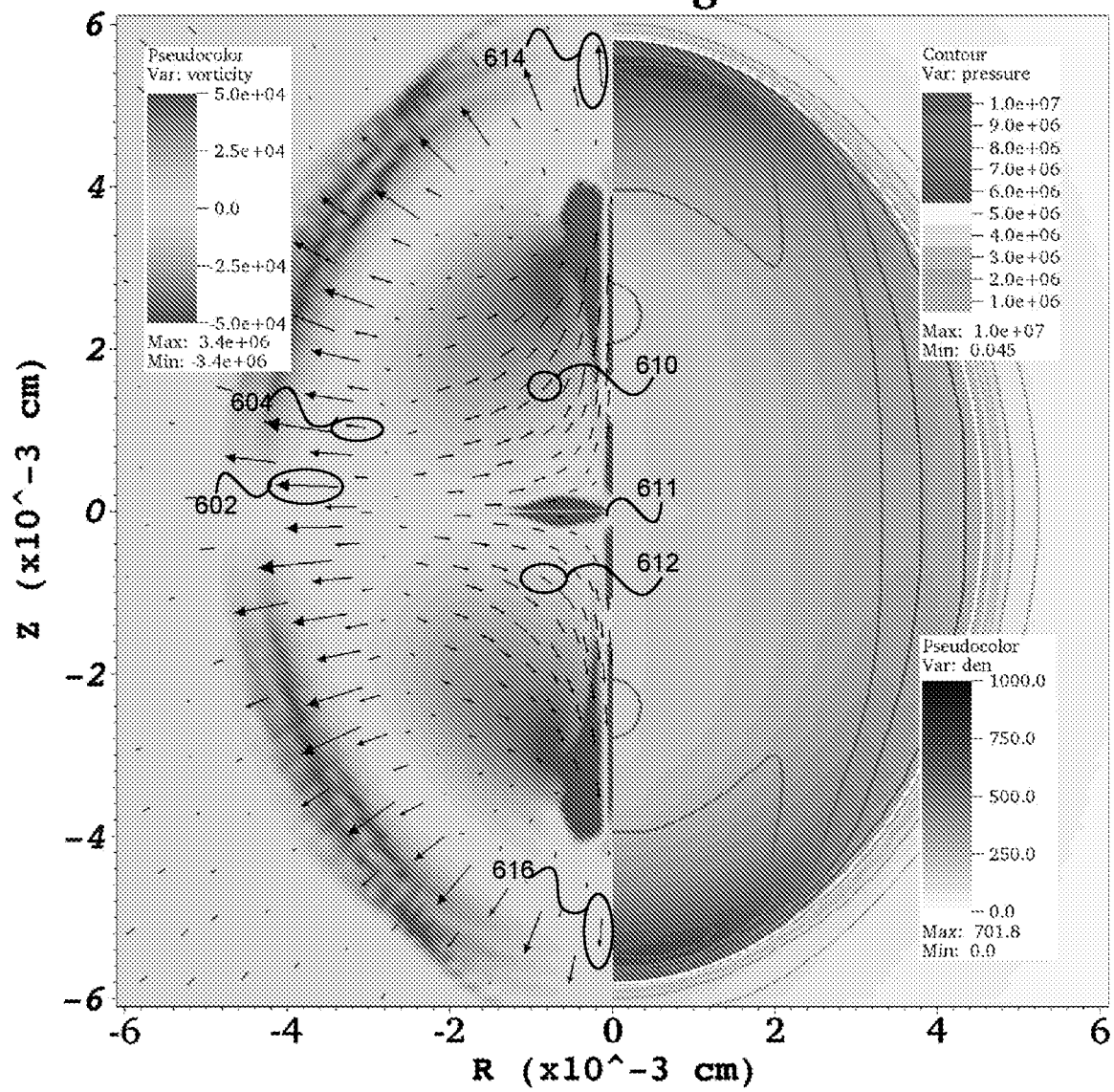
FIG. 6 depicts an example vector flow diagram of an ovoid target capsule at the time of ignition, in accordance with some example embodiments.

FIG. 6 depicts an example vector flow diagram produced by HYDRA for an ovoid target capsule at the time of ignition. The ignition time may also be referred to as "bang time," and "burn on" may refer to nuclear reactions being turned-on in HYDRA. The length of each vector in the example vector field of FIG. 6 are proportional to a velocity in the direction of each vector. For example, vector 602 shows a velocity that is outward from the target capsule. Vector 604 also shows an outward velocity with a smaller magnitude than vector 602. Vectors 610 and 612 show a velocity that is inward rather than outward. Gas in these regions are directed outward again as shown by vectors 614 and 616. There is no vector flow, or nearly no vector flow, near the center 611 of the target capsule. The small flow at the center and the flows around the center such as flows 610 and 612 protect the center of the target capsule (e.g., the target capsule hotspot) from perturbations. The protective flow may result from the ovoid shape of the target capsule. Spherical target capsules do not have a similar protective flow.

Figure 7A:
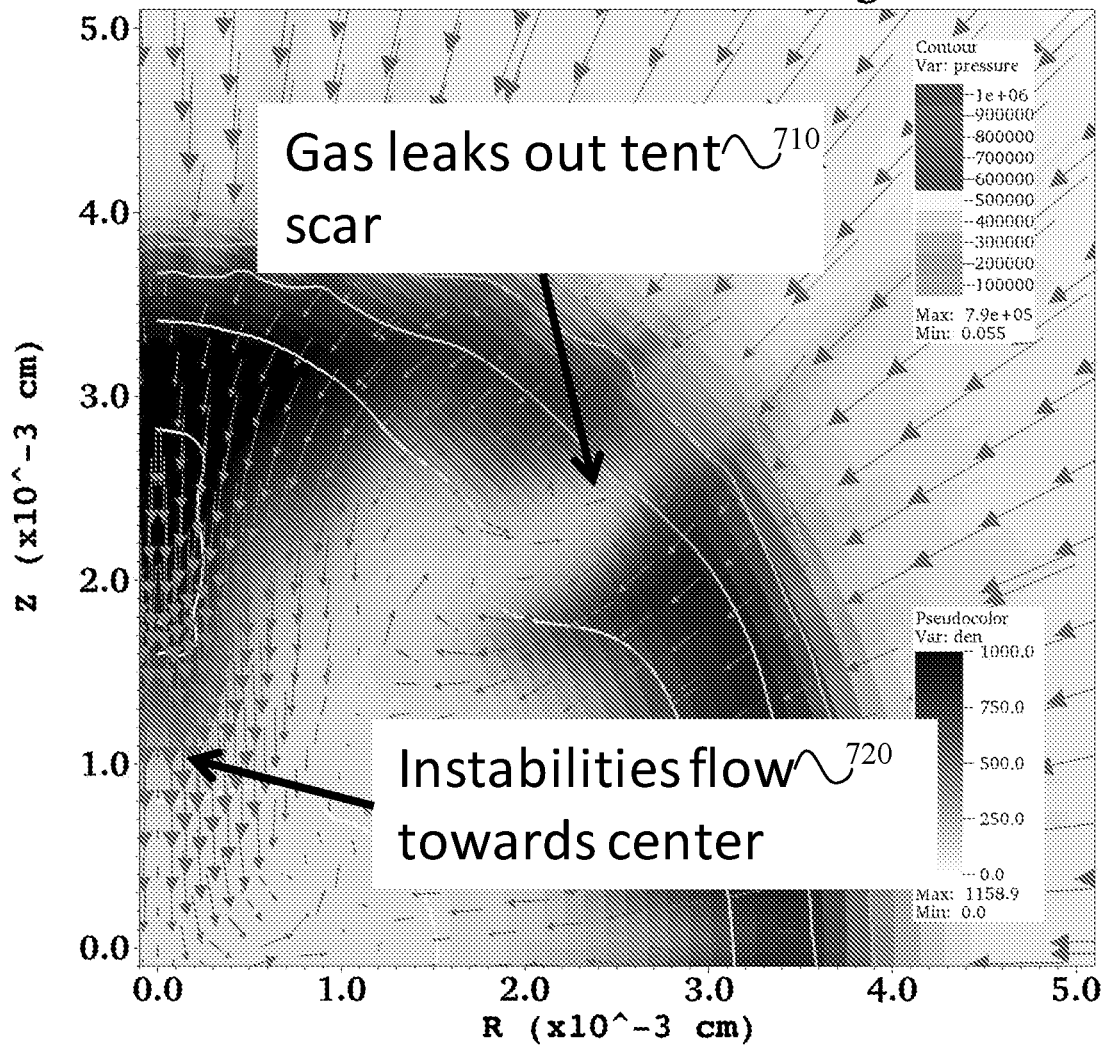
FIG. 7A depicts an example of a vector flow diagram for a round target capsule, in accordance with some example embodiments.

FIG. 7A depicts an example of a vector flow diagram for a round target capsule. The vector field in FIG. 7A corresponds to the round target capsule with nuclear reactions turned off ("burn off") at the time of ignition of the capsule ("bang time"). The example of FIG. 7A includes a drive imperfection ("P4"), a tent imperfection ("tent"), and an imperfection in the cryogenic target capsule including cracks in the ice causing the surface to not be smooth ("ice"). The vector field shows gas leaking out of the tent scar at 710 and instabilities flowing toward the center of the target capsule at 720. As can be seen in the example of FIG. 7A, the flow due to instability at 720 is not pushed away from the center of the round target capsule.

Figure 7B:
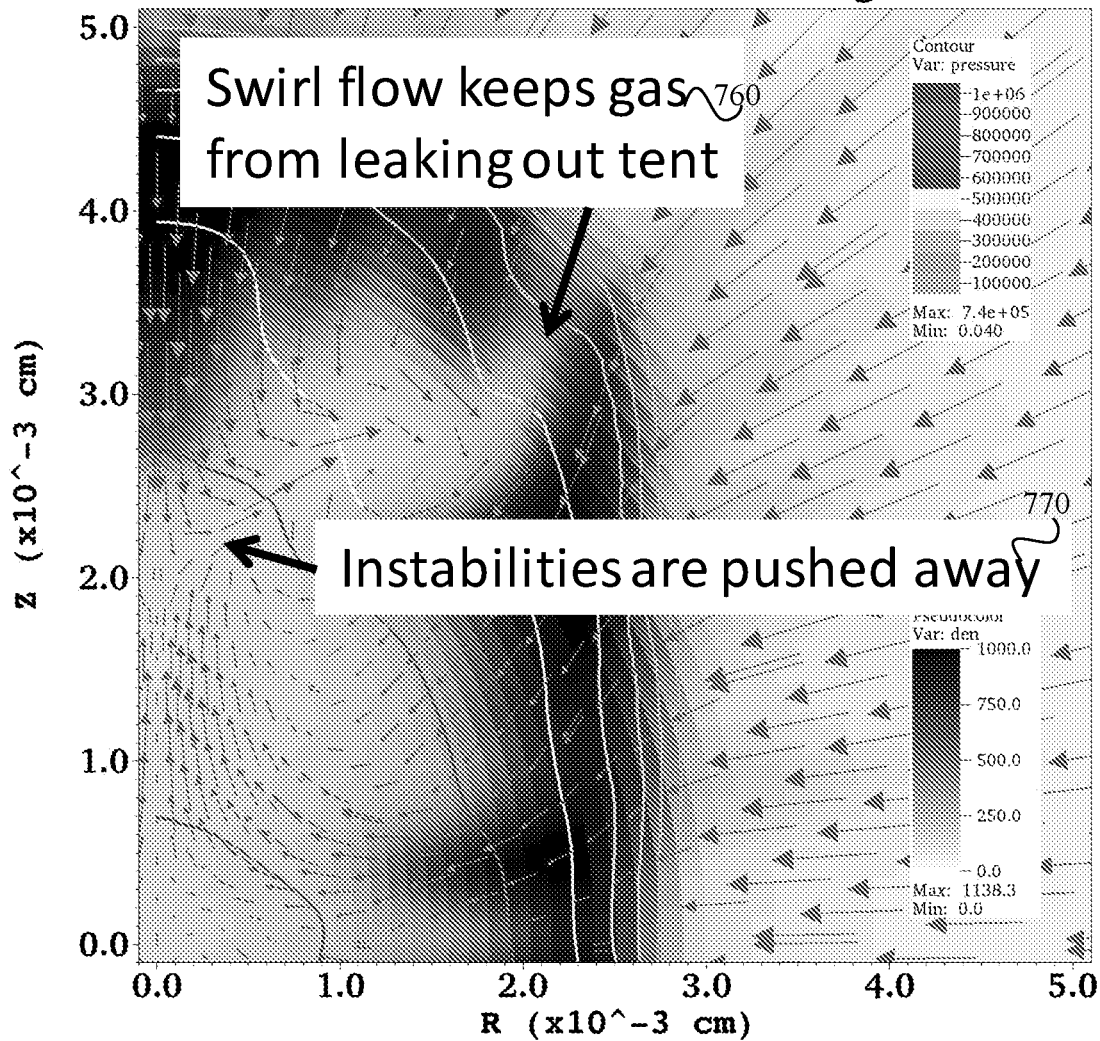
FIG. 7B depicts an example of a vector flow diagram for a ovoid target capsule, in accordance with some example embodiments.

FIG. 7B depicts an example of a vector flow diagram for a ovoid target capsule. The vector field in FIG. 7B corresponds to the ovoid target capsule with nuclear reactions turned off ("burn off") at the time of ignition of the capsule ("bang time"). The example of FIG. 7B includes a drive imperfection ("P4"), a tent imperfection ("tent"), and an imperfection in the cryogenic target capsule including cracks in the ice causing the surface to not be smooth ("ice"). The vector field shows swirling gas flow that keeps the gas from leaking out of the tent at 760 and instabilities pushed away from the center of the target capsule at 770. As can be seen in the example of FIG. 7B, the flow due to instability at 770 is pushed away from the center of the ovoid target capsule.

Inertial confinement fusion (ICF) may compress a hollow shell of cryogenic deuterium-tritium (DT) fuel to thermonuclear conditions. With direct and indirect drive, a spherical ice shell may be encased in an ablator material. In some implementations of direct drive, the outer surface may be heated directly by impinging laser beams. In some implementations of indirect drive, a hohlraum encasing the target capsule (also referred to herein as a DT shell) may be heated to produce x-rays to heat the outer surface. As the capsule surface ablates, the spherical shell compresses to high temperature and density resulting in gas at the center of the shell igniting a fusion burn wave. The fusion burn wave may consume the DT shell and releases large amounts of fusion energy.

The foregoing process may be sensitive to hydrodynamic instabilities, which can arise throughout the implosion. At early times, shocks can cause the Richtmyer-Meshkov growth of small-scale imperfections, which can be amplified by the Rayleigh-Taylor (RT) instability during the main capsule acceleration. As the capsule compresses, the back-pressure exerted by the central gas on the shell may cause the shell to decelerate, at which point the inner surface of the shell may become RT unstable. During this time, a perturbation of wave number k on the inner surface of a shell with characteristic density scale length $L_m$ and local ablation velocity $v_a$ (due to mass ablating into the forming hot spot) that experiences a deceleration of magnitude g can grow with a growth rate of the form, $$\gamma_{RT} = \alpha \sqrt{\frac{kg}{1+kL_m} - \beta k v_a}, \qquad \text{Eq. (1)}$$

In some implementations, $\alpha \approx 0.9$ and $\beta \approx 1.4$. Under converging geometry, Bell-Plesset-like (BP) effects can enhance this growth, such that the total linear growth from any perturbation increases with the convergence ratio $R(t=0)/R(t)$ of the shell.

The foregoing effects and processes can lead to a distorted asymmetric shell at stagnation, which may adversely affect performance. For example, the Ignition Threshold Factor (ITF) formalism defines an ignition metric that depends on (among other things) the hotspot radius, $R_{hs}$, and the mode-weighted RMS deviation from that hotspot, $\Delta R_{hs}$ $$ITF \propto \left(1 - 1.2 \frac{\Delta R_{hs}}{R_{hs}}\right)^4. \qquad \text{Eq. (2)}$$

Larger values of ITF may be more robust ignitors, and ITF can be used to estimate a capsule's margin. For example, a hot-spot deviation $\Delta R_{hs}/R_{hs}$ of 0.13 can reduce the margin for ignition by a factor of two. Other values of hot-spot deviation may also be used. The capsule performance may degrade when implosions are asymmetric.

Because non-radial capsule stagnation may be detrimental to performance, skilled artisans in the field developed techniques to produce nearly spherical implosions. This may be accomplished by minimizing the seeds for asymmetric stagnation. For example, this may be accomplished by placing engineering tolerances on the capsule surfaces, reducing the effective footprints of the capsule support tent and DT gas fill tube, and/or ensuring a smooth capsule drive. Additionally, one may reduce the total integrated linear growth of hydrodynamic instabilities via techniques such as adiabat shaping and/or via implosions with low convergence ratios.

In some embodiments consistent with the disclosed subject matter, a nonlinear stabilization process for ICF implosions may address drive and/or shell distortions. In particular, generated large scale coherent flows within the hotspot can stabilize other shell deformations that arise during stagnation. These flows, which are reminiscent of the zonal flows that appear in planetary atmospheres and magnetic fusion devices, can shear off both smaller scale instabilities and larger scale asymmetries, making these implosions more robust than those without zonal flows.

Implosions with these flows may not be spherical, but rather asymmetric. The shell may be formed in the shape of an ovoid during capsule deceleration and/or stagnation. As explained herein, the disclosed technology provides for ovoid shaped shells that have improved ignition margins over the customary belief consistent with Eq. (2) that spherical shells have the largest ignition margins.

The improvement by using an aspherical implosion may be shown using a machine learning algorithm trained on an ICF capsule simulation dataset. The dataset, a learning algorithm, and how to predict the improvement of using an ovoid shape is disclosed below along with a series of simulations and/or computations at a predicted robust point. The simulations and/or computations show that the ovoid implosions are more resilient to distortions driven by asymmetric drives and the capsule support tent than those driven symmetrically.

Simulations and/or computations consistent with the disclosed subject matter further quantify the performance of implosions under adverse conditions. Data science techniques may be used to search for implosions in flat regions of parameter space, thus being explicitly robust to perturbations around a design point. In this way, robustness may be optimized.

In some example embodiments, a baseline implosion design is chosen, a suite of multi-dimensional simulations of perturbations is generated around the baseline, and a quantity of interest Q (for instance, the total produced yield) is fit to a functional form of the i individual input variations $\bar{x} \in \mathbb{R}_d = \{x_i\}$, thereby creating a data-trained surrogate model $\tilde{Q} \approx Q$ that can be evaluated for any value of $\bar{x}$, not necessarily included in the original simulation ensemble. One can then use $\tilde{Q}$ to optimize $\bar{x}$ for robustness without performing additional simulations.

In studies that produce rules like Eq. (2), the surrogate model may be a power-law of the form, $$\tilde{Q}(\bar{x}) = \prod_i^d f_i(x_i)^{a_i},  \quad \text{Eq. (3)}$$

with $f_i(x_i)$ being an analytic function of the input parameters, such as $(1-b_i x_i)$, for a constant $b_i$. It is also possible as in Eq. (2) for the $x_i$ not to be simulation input parameters, but rather physical quantities extracted from the simulation database, like $\Delta R/R$.

Eq. (3) may be constructed as a linear regression on log $f_i$ and interpreted because the relative strengths and impacts of the various terms come directly from the constants $a_i$ and $b_i$. They can be built with datasets of a few hundred, a few thousand, or any other number of individual simulations. However, Eq. (3) may preclude interactions between the $x_i$ and the $a_i$ which may be held constant over the entire space. This may make power laws less favored for design optimization, when the $x_i$ are simulation input parameters.

To search for a robust implosion, we may look to a family of non-parametric $\tilde{Q}$, such as those generated by machine learning statistical algorithms. These methods may not necessarily make assumptions about the underlying structure or functional form of Q but may require many simulations to achieve a level of accuracy, especially when the input space is of high dimensionality (d>4). However, machine learning techniques can build accurate surrogate models from ICF simulation ensembles (without alpha-particle deposition) of d=7 with ~3500 simulations.

In some example embodiments, the application of machine learning to construct surrogate models for ICF implosions may be extended to search for a design that ignites under adverse conditions. A dataset disclosed herein consists of a nine-dimensional survey of drive amplitudes, asymmetries and convergence ratios, and uses machine learning techniques to build surrogate models for multiple quantities of interest. The surrogates may be combined to serve as fast and complex interpolators to the dataset, into a robustness cost function for optimization and find a set of input parameters that produce an optimally robust implosion. Additional surrogates may be queried, which may be trained on the individual Legendre moments of the DT fuel shape, and used to determine the optimal input parameters produce an ovoid shape at stagnation. The surrogate models may also predict that the optimal ovoid-shaped implosion is more resilient to a variety of perturbations than the baseline spherical implosion. Additional simulations at the optimal point (which are not in the original dataset) may be used to confirm the surrogate predictions and provide physical insight into the high performance of this implosion.

In one approach, the first step towards searching for a robust design is to create a large dataset of input simulations, upon which to build a surrogate model. In some example embodiments, an ensemble of approximately 60,000 two-dimensional ICF capsule simulations may be used. Any other number of capsule simulations may also be used.

The data-set may constitute a nine-dimensional parameter scan of time-varying drive magnitudes, drive asymmetries (described by Legendre modes 1, 2 and 4, $P_n$), and capsule gas fill densities. Due to its large size (e.g., 5 petabytes of raw data), the data may be processed using the disclosed in-transit data analysis technique which uses internal servers (built on the bean-stalked library) to direct dedicated compute nodes to analyze and erase raw data on-the-fly before overflowing the file system.

The baseline simulation may be run using radiation hydrodynamics code such as HYDRA, which is an axisymmetric variant of a high-density-carbon (HDC) National Ignition Facility (NIF) implosion design, meant to ignite in 1D, with a 20 μm dopant layer of 3% Si embedded in the 75 μm-thick shell of 1108 μm outer radius. Both the DT and the HDC may use tabular equations of state (LEOS 1018 and 64, respectively) and opacities. The ice layer may be 55 μm thick and the central gas may have a baseline density of $5 \times 10^{-4}$ g/cm$^3$. The initially Arbitrary-Lagrangian-Eulerian mesh with 513 angular zones and 321 impedance matched radial zones may remap to an entirely Eulerian elliptic mesh near stagnation to trade accuracy for robustness (99.9% of the simulations completed without human intervention). The nine-dimensional study may constitute Latin Hypercube Sampling of a space around the baseline implosion, with linearly varying drive magnitude A and asymmetry perturbations between three time points (the end of the first shock "trough," the end of the "rise" to peak laser power, and the end of "peak" radiation drive). Time-dependent perturbations may ramp-up from time zero and down from the end of peak power. $P_1$ and $P_4$ may have the same value at the three time points, but $P_2$ and A can vary (see FIGS. 8A-8B for an example). The peg points may be sampled linearly between ±[2, 10, 5, 25]% for [$P_1$, $P_2$, $P_4$, A]. The capsule gas fill density may be sampled logarithmically between 0.2× and 0.5×, for a total of 9 independent variables.

With the dataset, a machine learning technique may be used to build surrogate models that infer the behavior of multiple quantities of interest at any point within a design space, even where no simulations exist. In some example embodiments, Random forest regression may be used which may consist of a series of bootstrapped decision trees trained on subsets of the whole dataset. As such, a random forest can handle large quantities of high-dimensional data and incorporate nonlinearities, which may be important near regions of high yield that are potentially surrounded by steep "cliffs."

A random forest regression surrogate for the logarithm of the total energy yield ($\log_{10} Y$) may achieve an 80% cross-validation mean error of 8%. For example, the surrogate model may be trained on a random 80% of the data and the prediction tested against the other 20%: the mean error on the prediction for the 20% random hold-out points may be 8%. Being a statistical fit to the entire data set, the yield surrogate may not only allow for the continuous real-time interpolation of parameter space between the discrete samples but may also be used to define a metric for robustness. For this measure, a point in parameter space may be chosen and with the surrogate make 1000 random input variations within a hypercube centered at chosen location with side length $\Delta$ of 10% of the total sample space. The number of surrogate evaluations that achieve Y>1 MJ may serve as a local estimate of the probability of achieving high yield under variable conditions: $\mathcal{P}$ (Y>1|$\Delta$=0.1). This function may serve as a smoothing operator on the yield, filtering out narrow "peaks" of high performance in favor of more broad "plateaus."

Surrogates can be built for any number of extracted physical quantities, such as DT fuel areal density ($\rho R$), the first Legendre moments of the DT shell ($P_{0-8}$), and/or an ignition threshold factor metric ITFX$\doteq$Y($\rho R$)$^2$ ("ignition"$\doteq$ITFX$\geq$1) at the time of peak energy production ("bang time").

By combining the surrogate models, a cost function can be defined for multi-dimensional optimization that similarly weights robustness and yield:

$$C = 10^{\mathcal{P}} + \text{ITFX} \quad \text{Eq. (4)}$$

The first term in Eq. (4) may include broad areas of parameter space that ignite, and the second term may include locations that are high up the ignition cliff. To speed up convergence toward an optimal point, the first term may be weighted higher (which being a probability maximizes at 1) to make it of similar order as the second term (which crosses the ignition threshold at 1, but can be 10 or higher). Furthermore, because the operational space in this example is nine-dimensional and a single evaluation of $\mathcal{P}$ may use 1000 surrogate evaluations, a simplex based optimization algorithm may be chosen to avoid gradient evaluations in the search for a robust design.

Figures 8A, 8B:
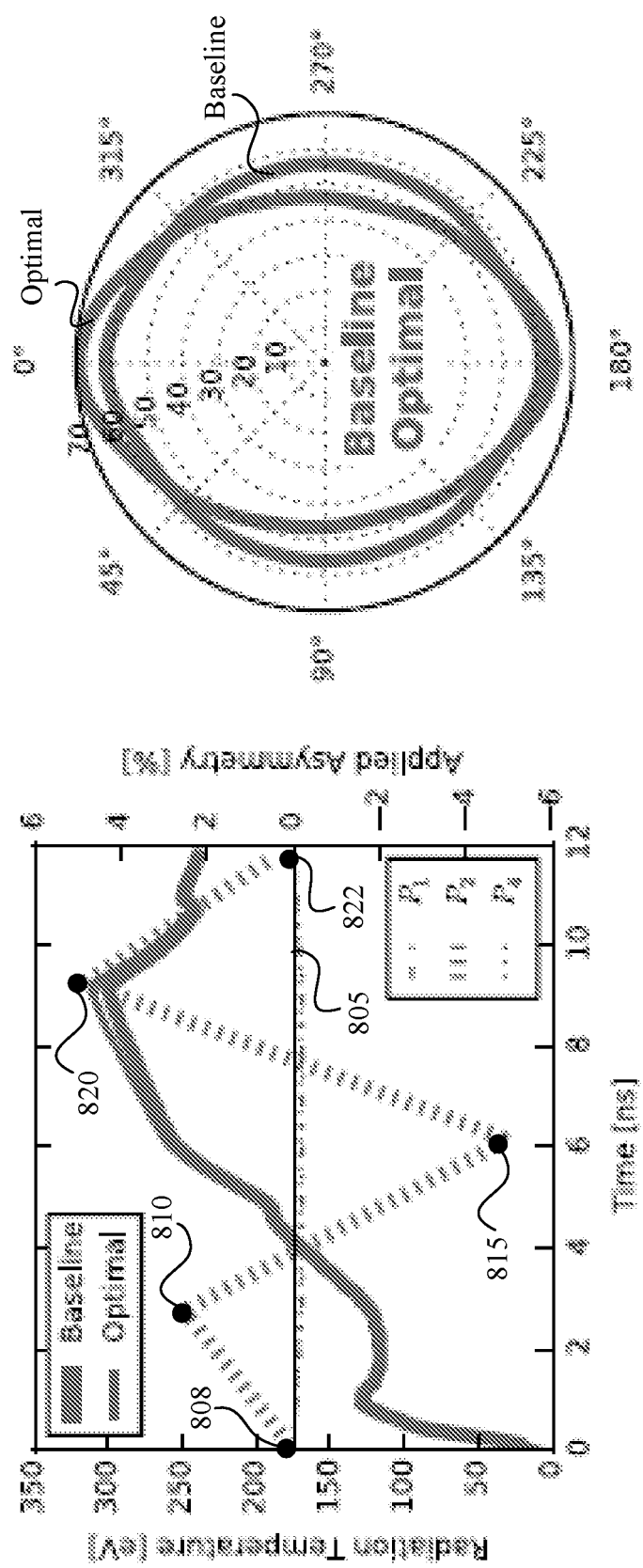
FIG. 8A depicts examples of asymmetrical radiation temperatures plotted as a function of time, in accordance with some example embodiments.
FIG. 8B depicts surrogate-predicted bang time fuel shapes (μm), in accordance with some example embodiments.

Optimization of Eq. (4) can produce the example drive shown in FIG. 8A. In some example embodiments, the optimal point has a 0.5× gas fill multiplier. The optimal point, which is predicted to achieve high yield, has a time-varying $P_2$ drive asymmetry. FIG. 8B compares the DT bang-time fuel shapes as predicted by the $P_n$ surrogate models for both the baseline and optimal drives. Due to the time-varying asymmetry, the stagnated shape of the optimal drive may be an ovoid rather than a sphere.

In the example of FIG. 8A, radiation temperature and applied asymmetry are plotted against time. The radiation temperature may correspond to a drive energy. Shown are baseline energies compared to the optimal energy. The drive asymmetry is shown at 810, 815, and 820. Drives above line 805 may correspond to polar drives and drives below line 805 may correspond to equatorial drives. In the example of FIG. 8A, a polar drive with an asymmetry of approximately 2% is applied at 810. For example, the 2% asymmetric drive may correspond to 2% more energy along the polar axis compared to the equatorial axis. At 815, an asymmetric drive may be applied with approximately 5% more equatorial drive than the polar drive. At 820, polar drive may again be applied with approximately an asymmetric drive of 4% more polar drive. The asymmetric drives such as 810, 815, and 820 may be applied in succession over a time period creating an oscillatory drive to the target capsule. For example, the oscillatory drive may correspond to a polar drive such as 810 followed by an equatorial drive such as 815, followed by a polar drive again at 820. In the example of FIG. 8A, three asymmetric oscillatory drives are shown. Other numbers of oscillatory drives may also be used. In the example of FIG. 8A, drives 808 and 822 may be symmetric drives having no or little asymmetry between the polar and equatorial energies.

Figure 9:
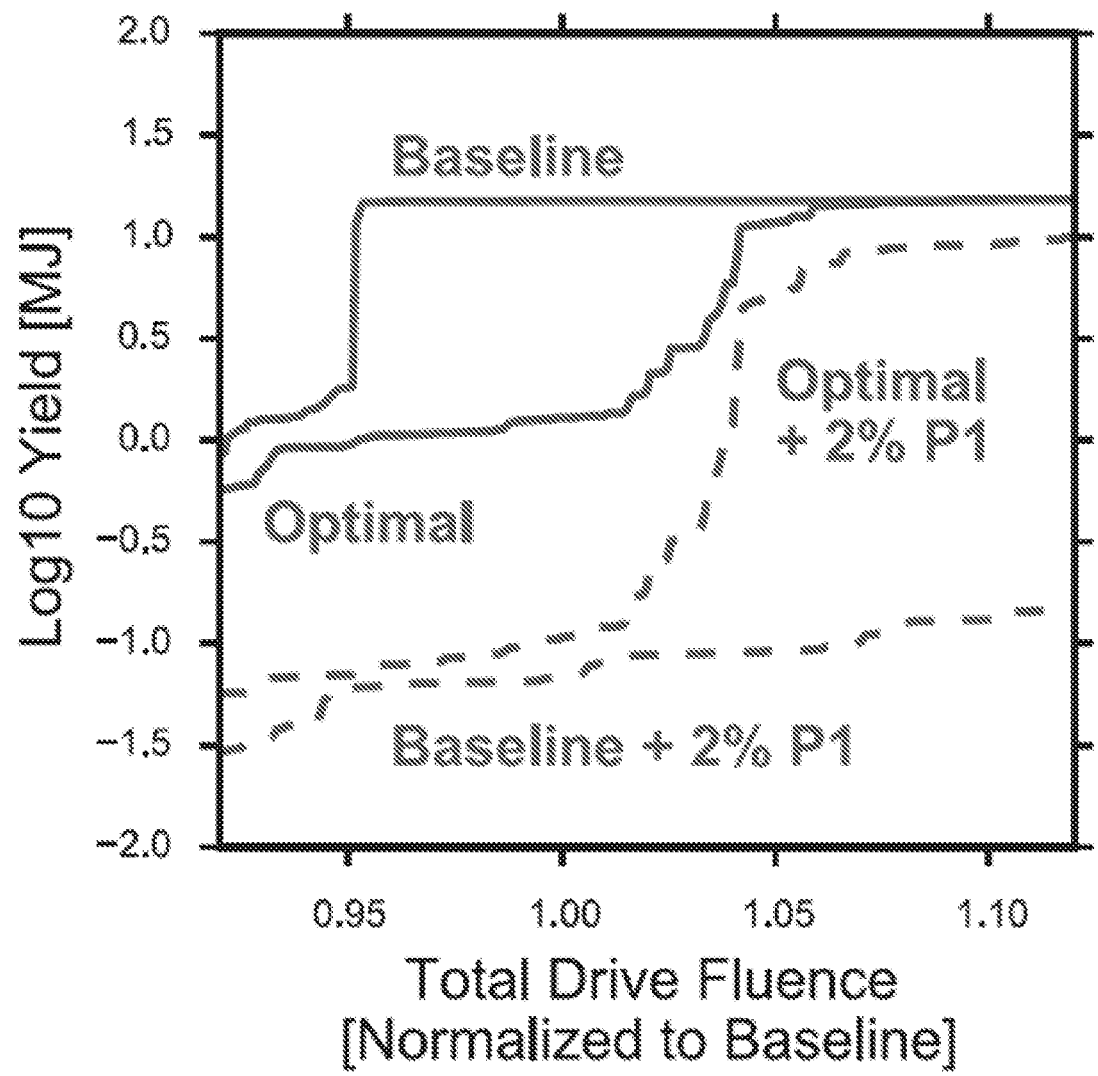
FIG. 9 depicts an estimate of yield under changing peak drive represented by the total normalized drive fluence for the baseline (round) and optimal (ovoid) target capsules, in accordance with some example embodiments.

The surrogates may also predict that the optimal ovoid-producing drive is more resistant to other perturbations than the symmetrically driven baseline. FIG. 9 shows surrogate outputs for yield under a changing peak drive multiplier, represented by the total drive fluence $\int T_r^4 dt$ (normalized to the baseline). This metric may serve as an estimate of the total laser energy to achieve a given radiation drive. To eliminate the effects of the remaining drive parameters, the optimal and symmetric implosions may be compared with the same gas fill, $P_1$, and $P_4$ perturbations such that the change in performance is due to the $P_2$ drive alone. Both designs may fall off in yield as the drive is reduced. While adding a +2% $P_1$ to the baseline may make ignition impossible for any drive in the example parameter space, the location of the optimal point's ignition cliff remains unchanged at 1.05 total fluence. FIG. 9 depicts the surrogate's estimate of yield under changing peak drive, as represented by the total normalized drive fluence $\int T_r^4 dt / (\int T_r^4 dt)_{baseline}$ for the baseline (round) and optimal (ovoid) cases. Unlike the baseline, the optimal point can ignite for fluences >1.05, even with an applied $P_1$.

Figures 10A, 10B:
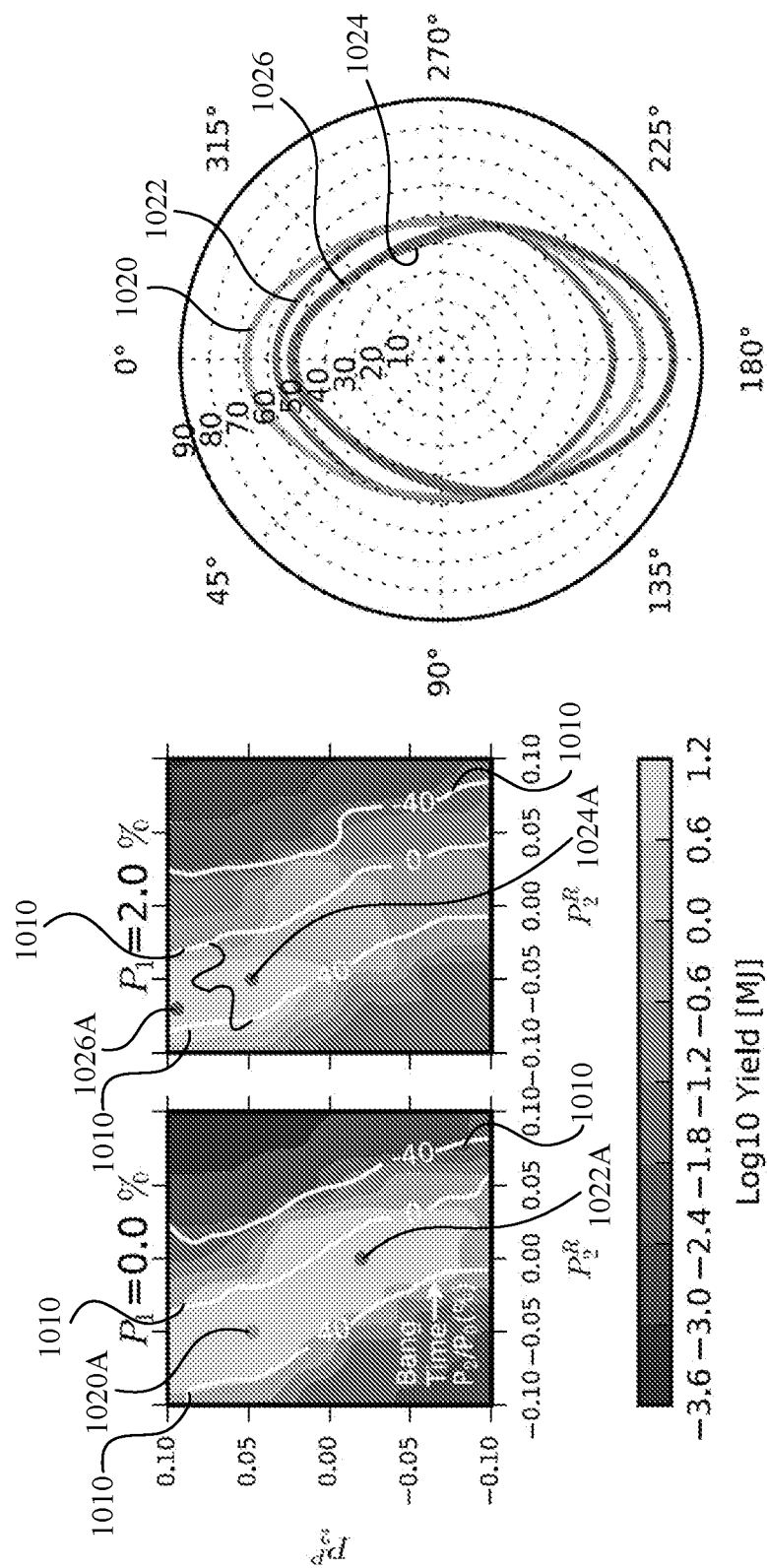
FIGS. 10A-10B depict contours of the surrogate predictions for the yield and bang time fuel $P_2/P_0$ for varying applied drive $P_2$ on the rise to peak power (PR) and at the end of the peak radiation drive ($P_2^P$), with and without an applied P perturbation, in accordance with some example embodiments.

Movement of the ignition cliff may be understood via yield contours predicted by the surrogate shown in FIG. 10A for varying $P_2$ drives on the rise to peak power ($P_2^R$) and at the end of the peak radiation drive ($P_2^P$). The contour lines 1010 correspond to the surrogate-predicted $P_2$ moment of the fuel at bang time, and the point 1020 indicates the location of the optimal implosion. There may be a broad, high-yield ridge along a line of compensating $P_2^R$ and $P_2^P$ drives, with higher yields favoring a negative $P_2^R$ and positive $P_2^P$. This compensating drive does not result in a round implosion, but rather an ovoid with positive $P_2$ ($\approx$20%) (see FIG. 10B for the reconstructed fuel shapes at the corresponding points shown in FIG. 10A). With a $P_1$ perturbation added, the high-yield ridge contracts toward more extreme compensating drives. The optimal implosion may remain within the ridge boundaries, while the round implosion may fall to low yield. Additionally, the high-yield ridge may appear to extend beyond the boundaries of the design space, which may suggest that an implosion with higher performance than the optimal point may be present if more extreme compensating $P_2$ drive perturbations are considered, outside the bounds of the considered dataset. The surrogate predictions in FIGS. 10A and 10B show that the optimal point may sit on a topological ridge in parameter space defined by compensating $P_2$ drives of opposite signs. More extreme variations in drive $P_2$ may be more robust to other perturbations. The high-yield ridge corresponds to ovoids rather than round implosions. Some ovoids may have bang-time fuel shapes given by $P_2/P_0 \approx$20%. FIG. 10A depicts contours of the surrogate predictions for the yield and bang time fuel $P_2/P_0$ for varying applied drive $P_2$ on the rise to peak power ($P_2^R$) and at the end of the peak radiation drive ($P_2^P$), with and without an applied $P_1$ perturbation. The reconstructed fuel shapes (μm) from the $P_0$-$P_8$ surrogates at the dots in FIG. 10A are plotted in FIG. 10B. In some example embodiments, FIG. 10A at 1020A depicts the optimal implosion. High-yield implosions lie along a ridge of compensating $P_2$ drives (negative on the rise, positive at the peak), with the ridge shifting that may require more extreme drives to reduce the effects of $P_1$. The $P_2$ drives that correspond to the high-yield ridge that may produce ovoid implosions with positive $P_2/P_0 \approx 20\%$. Point 1020A in FIG. 10A corresponds to curve 1020 in FIG. 10B, Point 1020A in FIG. 10A corresponds to curve 1020 in FIG. 10B, point 1022A corresponds to curve 1022, point 1024A corresponds to curve 1024, and point 1026A corresponds to curve 1026.

To confirm the surrogates' predictions of a robust ovoid at a location not in the original simulation database, a series of 2D HYDRA simulation may be performed for the optimal point and for a symmetric simulation with the same drive amplitude and gas fill, so that any differences are due to the time-varying drive asymmetry. To isolate alpha-particle bootstrapping from hydrodynamic effects, "burn-off" simulations with a reduced fusion cross-section may be performed (with their total reported yields re-scaled by the same factor for comparison to the full "burn-on" cases.) For example, with these conditions, the surrogate predicts, 17.4 MJ for the burn-on symmetric implosion and 15.2 MJ for the ovoid. HYDRA confirms the predicted high performance for the optimal point ($Y_{burn-on}$=16.6 MJ, $Y_{burn-on}/Y_{burn-off}$=355 for the ovoid vs. 17.2 MJ and 262 for round). This corresponds to a burn-on yield-over-1D of 97%, but a burn-off yield-over-1D of only 71%.

Figure 11:
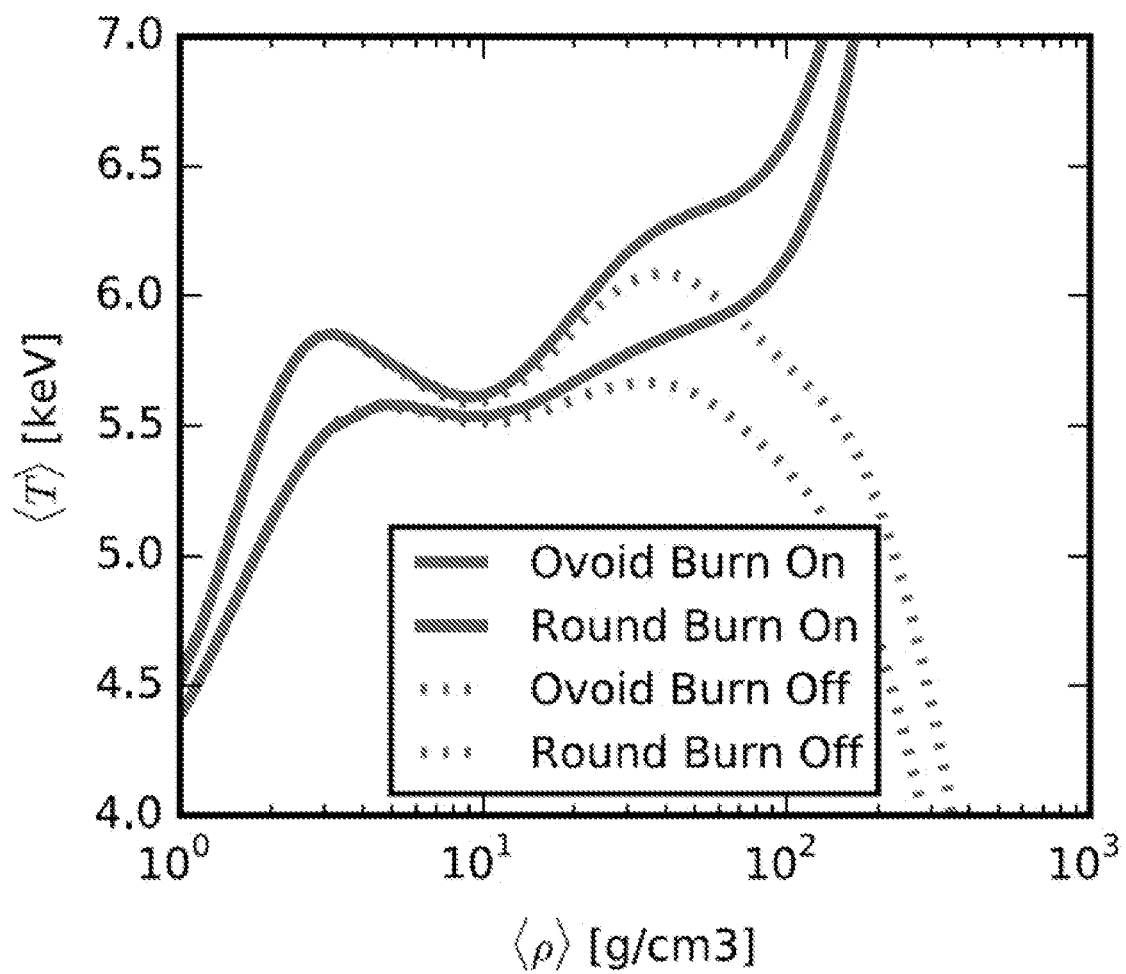
FIG. 11 depicts the trajectories of DT burn-rate averaged temperature and density for the round and ovoid implosions, in accordance with some example embodiments.

FIG. 11 depicts the trajectories of DT burn-rate averaged temperature and density for the round and ovoid implosions, in accordance with some example embodiments. The ovoid implosion compresses and burns at a higher density and lower temperature than a round implosion. Since the ICF hotspot self-heating condition can be written as $f(\rho R)>g(T)$ for some functions f and g, the higher density and lower temperature ovoid burn trajectories in FIG. 11 imply a more efficient burn process. This helps to explain the near 1-D full burn yield. FIG. 11 depicts trajectories in DT burn-rate weighted density and temperature for ovoid and round implosions (with and without alpha-particle heating). The ovoid may compress and burn at lower temperatures and higher densities than the round implosion.

Figure 12:
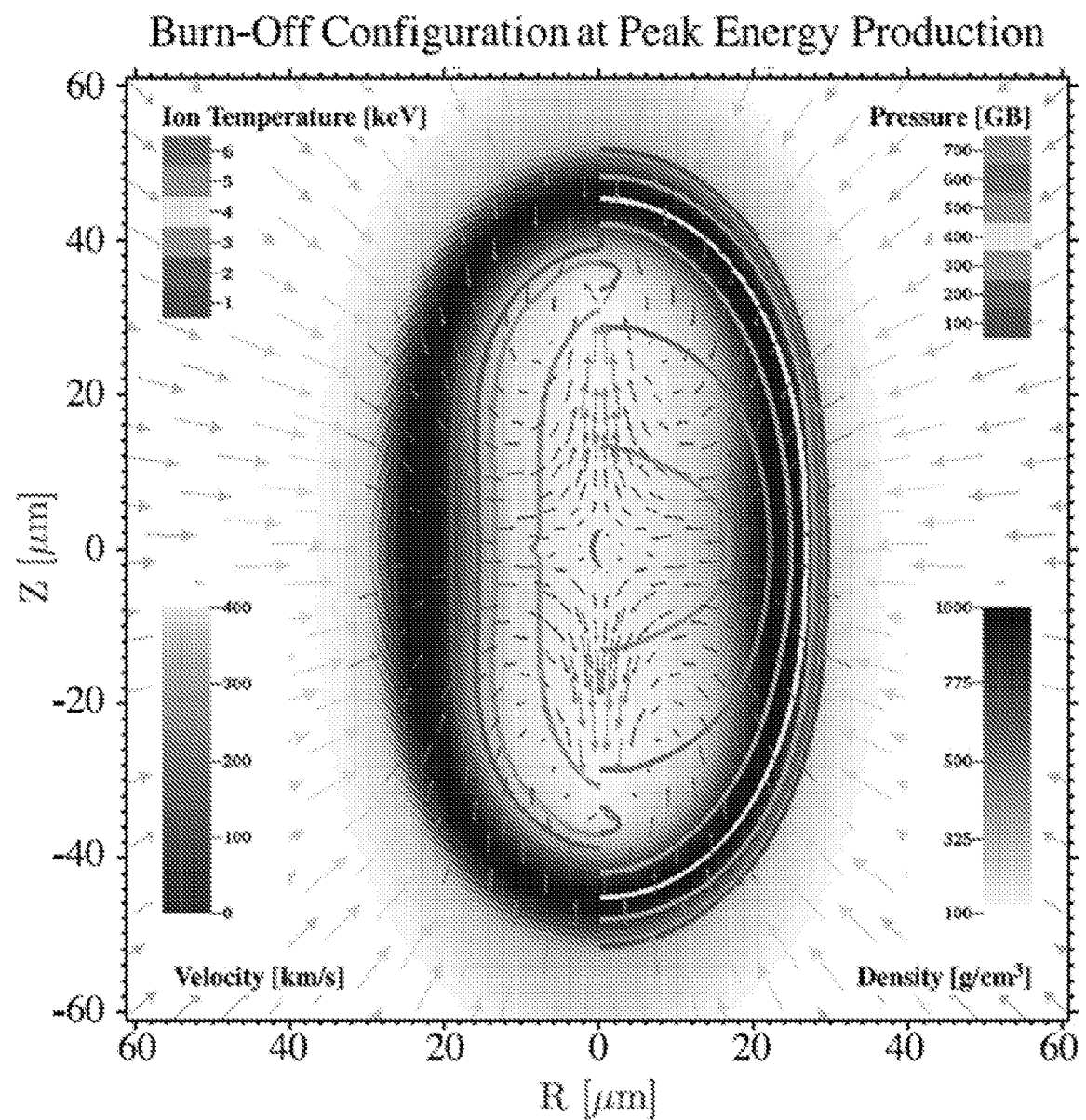
FIG. 12 depicts an example of a hotspot organizing into an particular configuration during stagnation, in accordance with some example embodiments.

HYDRA may be used to show how an ovoid shape arises from the time-dependent implosion dynamics. An asymmetric shock bounce (that begins deceleration) seeds vorticity in the gas. The negative $P_2$ drive on the rise to peak power may bias the capsule compression equatorially. As the compressed gas meets on axis, it may form axial jets. The late time positive $P_2$ drive may prevent the jets from escaping and the flow may circle on itself forming two co-axial counter-propagating vortex rings, and the hotspot may organize during stagnation into a configuration such as the example shown in FIG. 12. As shown, the exterior shell may conform to the vortex rings (forming an ovoid) and the central gas between the vortexes may become trapped in a vorticity quadrupole. The hotspot may be elongated and may not align with the high-pressure central core. Strong coherent flows may exist throughout the hotspot, so that the cold dense shell on the equator may accrete into the central high-pressure region, burn, and exhaust via the poles. A single fluid element may be estimated to take ~0.5 ns to make a complete revolution of the eddies shown in FIG. 12, longer than typical ($\leq 0.1$ ns) ICF burn and disassembly times. FIG. 12 depicts velocity (arrows), density (gray), ion temperature (left side contours), and pressure (right side contours) at the time of peak energy production for a burn-off HYDRA simulation of the ovoid implosion.

Figure 13:
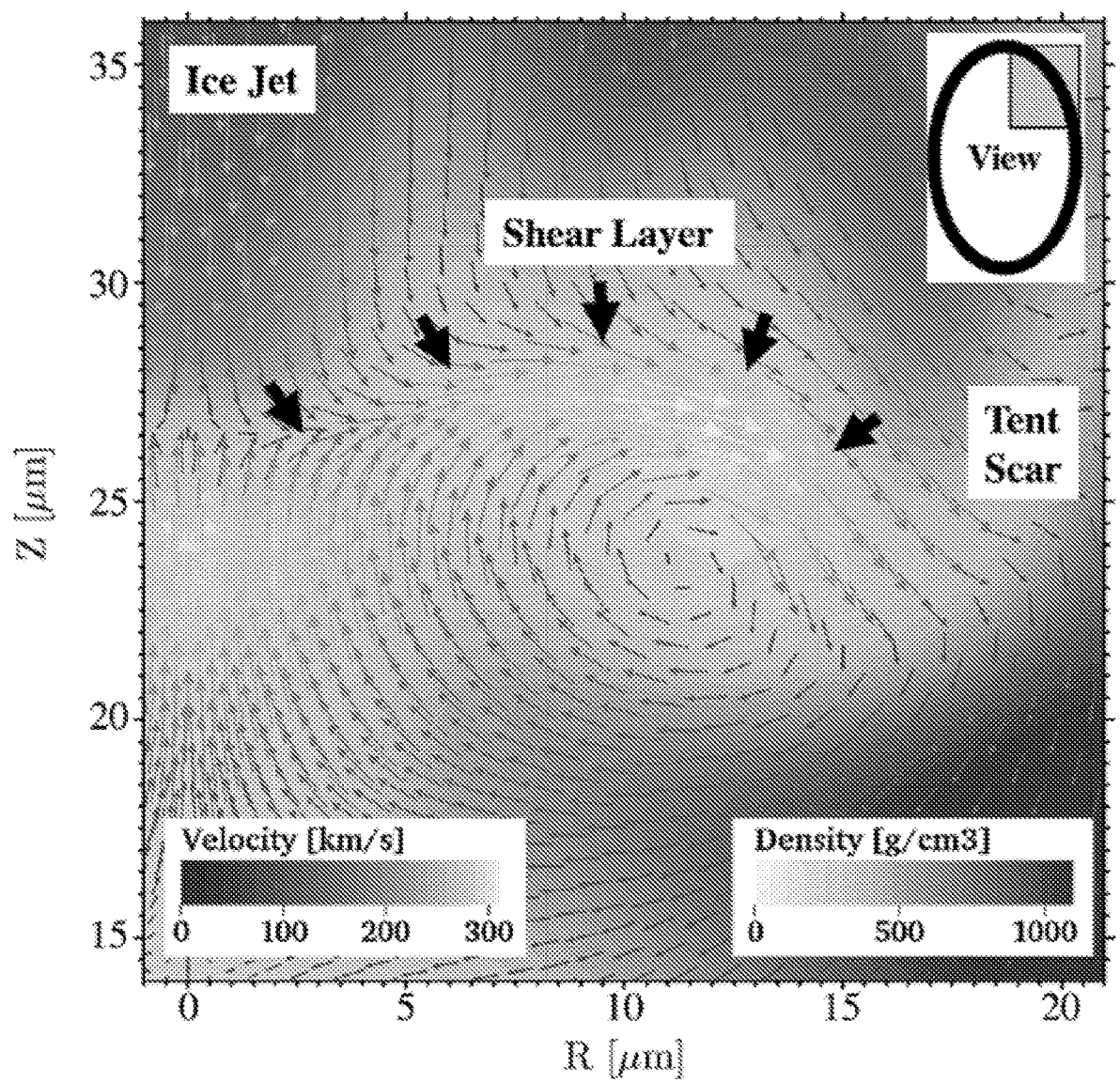
FIG. 13 depicts an example plot of the upper right section of a stagnating shell for a burn-off ovoid implosion with added roughness on the inner ice surface and a perturbation on the ablator surface, in accordance with some example embodiments.

These flows may nonlinearly suppress the growth of hydrodynamic instabilities. FIG. 13 shows an example plot of the upper right section of a stagnating shell for a burn-off ovoid implosion with added roughness on the inner ice surface (at NIF ignition specifications) and a perturbation on the ablator surface due to the capsule support tent (calibrated to a 100 nm tent on an HDC capsule). A first distortion depicted in the example of FIG. 13 is a large on-axis jet, originally seeded by ice surface roughness, that is entrained in a large axial flow field, directed down toward the central hotspot. A second, distortion shown is the shell having a visible low-density "scar" due to the tent. However, the background flow may meet the axis jet head-on, form a high velocity (>300 km/s) shearing layer, and direct the jet away from the hotspot. The shear layer may direct the flow field tangentially to the tent scar, reducing convective loss through the tent hole. FIG. 13 depicts density and velocity fields in the upper part of the stagnating shell for an ovoid burn-off HYDRA simulation perturbed with ice layer roughness and capsule support tent membrane. The background flows may set up a high-velocity shear layer (thick arrows) that mitigate the effects of the perturbations during stagnation.

The shearing in FIG. 13 may be strong enough to compete with shell distortions that occur during deceleration. The local shear rate can be estimated as the ratio of the local velocity to the eddy size. In the example of FIG. 13, the eddy is roughly 5 μm across with an average velocity of (150+300)/2=225 μm/ns, which gives a shearing rate of 45 ns$^{-1}$. Perturbations on the shell may evolve at a characteristic rate that can be estimated as either the RT growth rate (given by Eq. (1)) or the inverse of the shell breakup time τ

$$\tau = \sqrt{\frac{2\pi R(\rho R)_{shell}}{lP_{stag}}},$$

Figure 14:
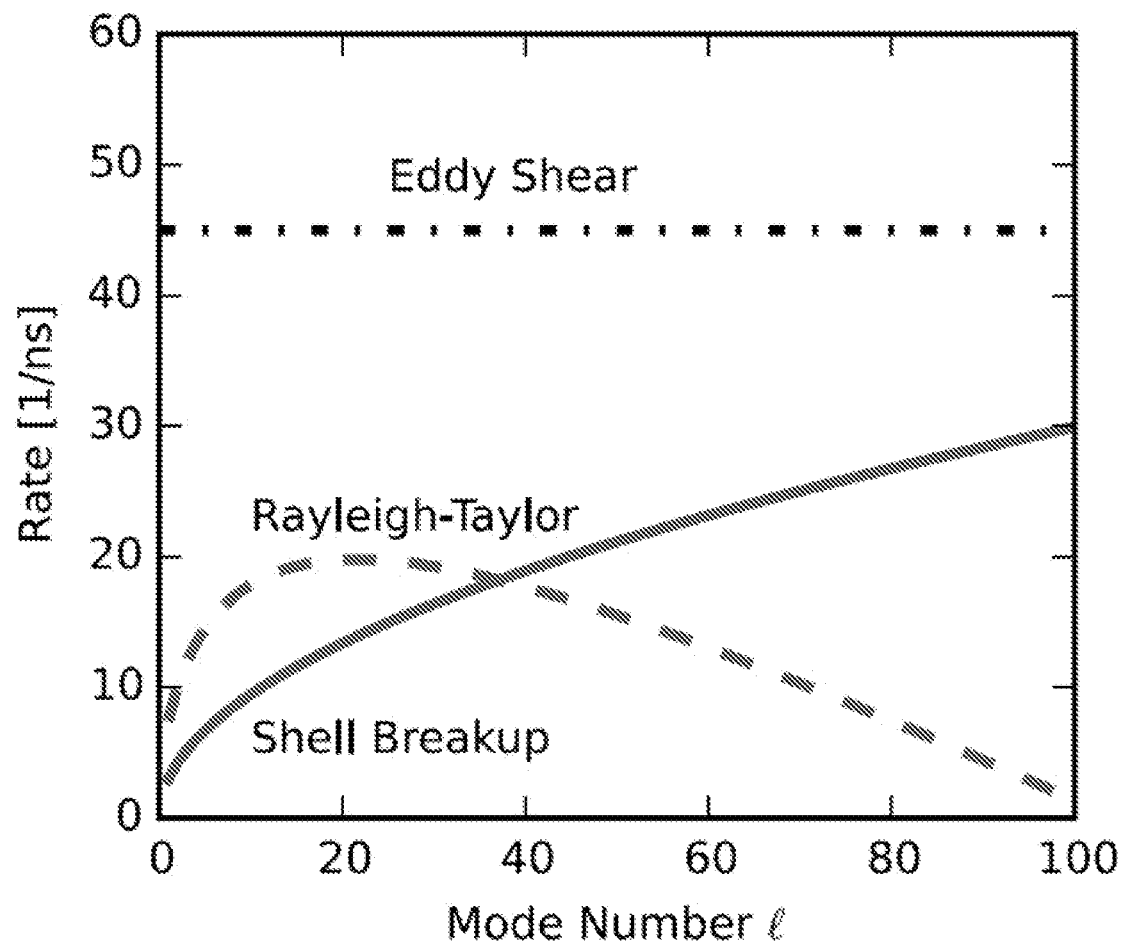
FIG. 14 depicts examples of rates as a function of mode number, in accordance with some example embodiments.

Eq. (5)

for some mode number $l=kR$ on a shell with areal density $(\rho R)_{shell}$ stagnating against a hotspot with pressure $P_{stag}$. FIG. 14 shows that the eddy shear rate may be larger than both rates predicted by Eqs. (1) and (5), suggesting that the shear flows present in the ovoid may be strong enough to impact the growth of shell perturbations during capsule deceleration. FIGS. 7A-7B depict an example of the local shearing rate of the eddy in FIG. 13 which is larger than both the deceleration Rayleigh-Taylor growth rate (Eq. (1)) and the shell breakup rate (Eq. (5)).

Figure 15:
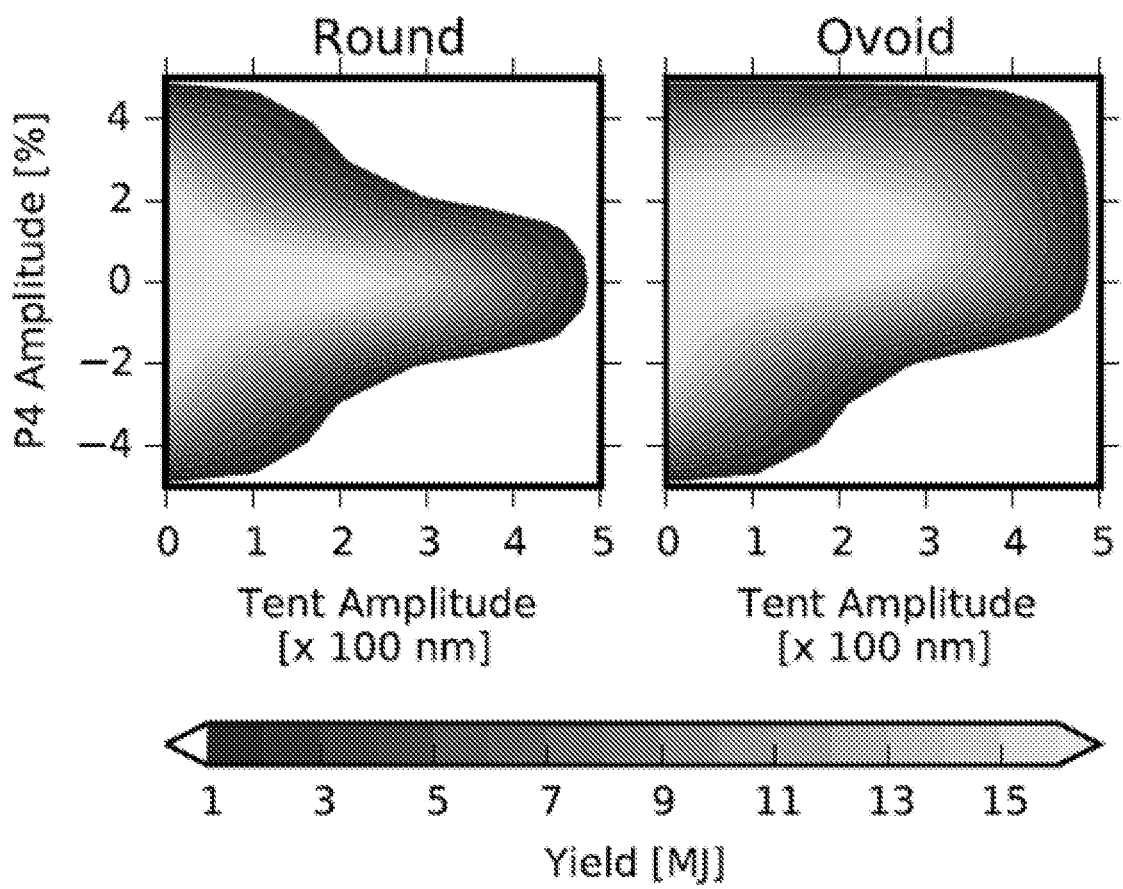
FIG. 15 depicts performance of round and ovoid yields, in accordance with some example embodiments.

Ovoid implosions can tolerate larger distortions than round implosions. FIG. 15 shows of examples of contours of yield >1 MJ for the round and ovoid implosions with varying levels of applied $P_4$ asymmetry and tent amplitude. In the example of FIG. 15, the performance of both implosions falls off with increasing perturbation strength, but the ovoid implosion may maintain high yield for a larger parameter range. For example, the ovoid may produce >9 MJ with a 300 nm tent and +3% $P_4$, where the round implosion fails to ignite. FIG. 15 depicts contours of yield for the round and ovoid implosions under combination $P_4$ drive asymmetry and tent perturbation amplitude.

Simulations confirm the surrogates' predictions of an asymmetric ovoid implosion that is more resilient to perturbations than symmetrically driven one-dimensional designs.

The subject matter disclosed herein includes a new class of ICF implosions. The new implosions are ovoid in shape which challenge the philosophy behind the traditional view including Eq. (2) that suggest spherical implosions uniformly outperform aspherical implosions. The new implosions may be driven by strong time-varying drive asymmetries which may serve to set up large-scale coherent convective flows at stagnation. Ovoid implosions may be more robust than spherical implosions to shell perturbations from either drive asymmetries or the hydrodynamic growth of smaller-scale shell imperfections. They may be more robust due to locally strong shearing rates induced by the flows.

Although the ovoids challenge the notion that the ideal implosion is symmetric (that asymmetries always degrade performance), they are consistent with some studies and anecdotal observations of improved performance with positive $P_2$ shapes.

The ovoid shape may cause large-scale convective flows that circulate into the hotspot on the equator and out via the poles. In fluid dynamics, the upper and lower solutions are repelling circular vortexes (like smoke rings and mushroom clouds) joined by a Burger's vortex at the origin, all of which are axially symmetric 3D fluid solutions with increased stability at low Reynolds numbers, like those expected in ICF hotspots.

This flow pattern is similar to that proposed to exist in the Jovian core that drives the large zonal flows on the planet's surface. Zonal flows also play a prominent role in the stabilization of magnetic fusion drift wave turbulence. These waves, like the Rossby waves in planetary atmospheres, experience an inverse cascade phenomenon, in which small scale perturbations can nonlinearly couple energy into larger scales. As such, larger scale flows can serve as energy sinks for smaller scales by shearing away perturbations as they grow.

The ovoid implosions may exhibit a process. Because nonlinear Rayleigh-Taylor bubble merger can be thought of as an inverse cascade process (smaller bubbles merge into large bubbles), the stabilization of small-scale perturbations by larger scale flows may occur during the capsule stagnation phase. The flow fields induced in the ovoid implosion may protect the hotspot from shell imperfections during stagnation by serving as an energy sink for smaller scale shell instabilities, shearing away unstable shell imperfections. The central hotspot may not be in a hydrostatic equilibrium, but rather a nonlinear hydrodynamic one, dominated by coherent convective flow.

Zonal flows induced in ICF implosions allows for a nonlinear mechanism for the stabilization of stagnating shells. Stabilization may come at a price, as the example of FIG. 9 shows, that the required energy to ignite an oval implosion is higher than a perfectly spherical implosion (e.g., roughly 8%). In this sense, the ovals contain a finite amount of residual hotspot kinetic energy at stagnation, but that energy may be coherently organized in a stabilizing flow pattern, trading one-dimensional margin for robustness in higher dimensions.

Disclosed herein is a class of high-performing asymmetric implosions that are more robust to drive and shell perturbations than those driven symmetrically. A machine learning algorithm was trained on a large simulation dataset to show a stable implosion not shown before.

From the foregoing, it will be appreciated that specific embodiments have been described herein for purposes of illustration, but that various modifications may be made without deviating from the scope of the disclosure.

Therefore, it will be appreciated that the scope of the present disclosure fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present disclosure, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

Although the description above contains many details and specifics, these should not be construed as limiting the scope of the disclosure but as merely providing illustrations of some of the presently preferred embodiments. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

What is claimed is:

1. An asymmetric inertial confinement fusion method comprising:

fixing in position a target capsule comprising an inertial confinement fusion fuel, wherein the target capsule is spherical; and asymmetrically applying a first oscillatory compression to the target capsule at a first time with more energy along a first axis of the target capsule than a second axis orthogonal to the first axis of the target capsule, wherein no oscillatory compression is applied to the target capsule prior to the first time;

asymmetrically applying a second oscillatory compression to the target capsule at a second time with more energy along the second axis than the first axis; and causing an ovoid shaped implosion of the target capsule by applying a third oscillatory compression to the target capsule at a third time, wherein the first time occurs before the second time and the second time occurs before the third time, and wherein no oscillatory compression after the third time is applied to the target capsule prior to the ovoid shaped implosion.

2. The asymmetric inertial confinement fusion method of claim 1, wherein the target capsule includes one or more of deuterium, tritium, or helium-3.

3. The asymmetric inertial confinement fusion method of claim 1, wherein the target capsule is held inside a hohlraum.

4. The asymmetric inertial confinement fusion method of claim 3, wherein the target capsule is cooled in the hohlraum and held in the hohlraum by support structures.

5. The asymmetric inertial confinement fusion method of claim 1, wherein the first, second, and third oscillatory compressions are performed by one or more of a laser beam or an ion beam.

6. The asymmetric inertial confinement fusion method of claim 1, wherein the third oscillatory compression applies equal energy along the first axis and the second axis.

7. The asymmetric inertial confinement fusion method of claim 1, wherein the third oscillatory compression applies more energy along the first axis than the second axis.

8. The asymmetric inertial confinement fusion method of claim 1, wherein the third oscillatory compression applies less energy along the first axis than the second axis.

9. The asymmetric inertial confinement fusion method of claim 1, wherein the first axis is an equatorial axis.

10. The asymmetric inertial confinement fusion method of claim 1, wherein the second axis is a polar axis.

11. The asymmetric inertial confinement fusion method of claim 1, wherein the first, second, and third oscillatory compressions are delivered via direct drive to the target capsule.

12. The asymmetric inertial confinement fusion method of claim 3, wherein the first, second, and third oscillatory compressions are delivered to the target capsule by directing beams that impinge on an inside surface of the hohlraum before reaching the target capsule.

13. The asymmetric inertial confinement fusion method of claim 1, wherein asymmetrically applying one or more of the first or the second oscillatory compression causes the target capsule to become ovoid in shape.

* * * * *